United States Patent
Miyata

(10) Patent No.: US 11,605,358 B2
(45) Date of Patent: Mar. 14, 2023

(54) LIQUID CRYSTAL DISPLAY INCLUDING TWO OVERLAPPING DISPLAY PANELS THAT DIFFER FROM EACH OTHER IN TERMS OF THE SIZE OF THEIR RESPECTIVE DISPLAY PIXELS

(71) Applicant: SHARP KABUSHIKI KAISHA, Sakai (JP)

(72) Inventor: Hidekazu Miyata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/674,403

(22) Filed: Feb. 17, 2022

(65) Prior Publication Data

US 2022/0293060 A1  Sep. 15, 2022

Related U.S. Application Data

(60) Provisional application No. 63/160,508, filed on Mar. 12, 2021.

(51) Int. Cl.
*G09G 3/36* (2006.01)
*G02F 1/13357* (2006.01)

(52) U.S. Cl.
CPC ..... *G09G 3/3607* (2013.01); *G02F 1/133606* (2013.01)

(58) Field of Classification Search
None
See application file for complete search history.

(56) References Cited

U.S. PATENT DOCUMENTS

| | | | |
|---|---|---|---|
| 2007/0242186 A1* | 10/2007 | Ikeno | G02F 1/13471 349/74 |
| 2009/0153780 A1* | 6/2009 | Takata | G02F 1/13471 349/161 |
| 2011/0234612 A1* | 9/2011 | Wei | G09G 3/3426 345/589 |
| 2016/0097962 A1* | 4/2016 | Kim | G02F 1/0121 359/238 |
| 2018/0120639 A1* | 5/2018 | Shih | G02F 1/133603 |
| 2020/0175934 A1* | 6/2020 | Hirotsune | G09G 5/06 |
| 2021/0193061 A1* | 6/2021 | Nakanishi | G09G 3/3607 |

FOREIGN PATENT DOCUMENTS

| | | | |
|---|---|---|---|
| CN | 110383161 A | * 10/2019 | G02B 6/0011 |
| JP | 2007310161 A | * 11/2007 | |
| JP | 2007310161 A | 11/2007 | |

* cited by examiner

Primary Examiner — Kirk W Hermann
(74) Attorney, Agent, or Firm — ScienBiziP, P.C.

(57) ABSTRACT

A control unit receives an input image signal including input display gray scale data corresponding to the virtual opposing regions, selects a set of pieces of subpixel gray scale data corresponding to the virtual opposing regions from the input display gray scale data, extracts a maximum amount of subpixel gray scale data among the set of pieces of subpixel gray scale data as extracted gray scale data corresponding to one first pixel facing the virtual opposing regions among the plurality of first pixels, and controls a transmittance of light of the one first pixel using designated pixel gray scale data in a case where the extracted gray scale data has a level equal to or higher than an output determination reference gray scale level, the designated pixel gray scale data being gray scale data having a maximum transmittance of a first liquid crystal panel.

4 Claims, 21 Drawing Sheets

LIQUID CRYSTAL DISPLAY INCLUDING TWO OVERLAPPING DISPLAY PANELS THAT DIFFER FROM EACH OTHER IN TERMS OF THE SIZE OF THEIR RESPECTIVE DISPLAY PIXELS

CROSS-REFERENCE TO RELATED APPLICATION

The present application claims priority to U.S. Provisional Application Ser. No. 63/160,508, filed Mar. 12, 2021, the content to which is hereby incorporated by reference into this application.

BACKGROUND

1. Field

The disclosure relates to a liquid crystal display device (LCD).

2. Description of the Related Art

As disclosed in JP 2007-310161 A below, a liquid crystal display device that improves contrast by superimposing two liquid crystal panels (hereinafter, also referred to simply as "panels") on each other has been developed. In the liquid crystal display device disclosed in JP 2007-310161 A, the size of one pixel of a rear panel provided on a side relatively near a backlight and the size of one pixel of a front panel provided on a side relatively far from the backlight are the same.

SUMMARY

In the liquid crystal display device as described above, the size of one pixel of a rear panel provided on a side relatively near the backlight and the size of one pixel of a front panel provided on a side relatively far from the backlight may be different. In this case, the correspondence between the pixel of the front panel and the pixel of the rear panel is not one to one. For this reason, in a case where an image is to be displayed on a display screen with a desired luminance using such a liquid crystal display device, the following problems occur.

First, the image signal to be displayed will be described. An image signal input to the liquid crystal display device has pixel data having one resolution among some resolutions defined by an image signal standard. A virtual pixel of a display resolution included in the image signal is hereinafter referred to as a display pixel, and pixel data corresponding to the display pixel is denoted as display gray scale data. The display resolution of the image signal is determined by a standard, and in the case of a video called, for example, full high definition (FHD), the number of display pixels of one frame is 1920 (horizontal direction)×1080 (vertical direction). In addition, for example, in the case of a display resolution of ultra high definition television (UHD TV) which is referred to as 4K, the image signal thereof includes display gray scale data of a number of display pixels of 3840 (horizontal direction)×2160 (vertical direction). In this manner, the number of display pixels changes depending on a display resolution of a video. At present, there are many image signal standards of display resolutions.

On the other hand, in a liquid crystal panel, the number of pixels of the panel is determined during design in accordance with a target video resolution of a liquid crystal display device. In order to distinguish between a display pixel and the number of display pixels described above, a pixel of a panel and the number of panel pixels will be hereinafter referred to as a panel pixel and a panel pixel number, respectively. For example, in the case of a liquid crystal panel for TV, the liquid crystal panel has a panel pixel number of 1920 (horizontal direction)×1080 (vertical direction), which is generally the display resolution of FHD. On the other hand, liquid crystal display devices to which an image signal having a display resolution of FHD is input also include a liquid crystal display device having a panel pixel number of 1366 (horizontal direction)×768 (vertical direction), and the like when the screen size is small. In this manner, the panel pixel number also varies depending on the application of a product.

However, since there are a large number of display pixel numbers of an image signal input as described above, a liquid crystal display device needs to display a video in response to each of the display pixel numbers. On the other hand, a panel pixel number of a liquid crystal panel of a liquid crystal display device is one type determined during design. Thus, a liquid crystal display device may have a function of performing resolution conversion from a display pixel number of an input image signal into a panel pixel number of the liquid crystal panel provided therein. The resolution conversion will be hereinafter referred to as scaling.

An image signal scaled to a panel pixel number includes display gray scale data corresponding to the panel pixel number in each frame. Each piece of display gray scale data corresponding to a display pixel is sequentially input to a control unit that controls a liquid crystal panel, and is input to each pixel of the panel as gray scale data of each pixel of the liquid crystal panel. An image of any one frame of a video is displayed on the liquid crystal display device by the transmittance of each pixel of the panel being controlled in this manner. Hereinafter, for convenience, in the specification, the scaled image signal input to the control unit of the panel will be referred to as an input image signal, gray scale data corresponding to a display pixel of the input image signal will be referred to as input display gray scale data, and gray scale data input to the panel pixel of the liquid crystal panel will be referred to as panel input gray scale data.

In other words, the above-described contents are as follows. In a liquid crystal display device, an input image signal is scaled. The scaled input image signal is constituted by input display gray scale data corresponding to display pixels for each single frame. The input display gray scale data is sequentially input to a control unit for driving a liquid crystal panel. Panel input gray scale data of a panel pixel corresponding to the input display gray scale data is sequentially input from the control unit to the corresponding panel pixel.

In a liquid crystal display device having one liquid crystal panel, the display pixel and a panel pixel correspond to each other on a one-to-one basis, and the input display gray scale data and the panel input gray scale data thereof correspond to each other on a one-to-one basis and have the same value.

In a liquid crystal display device provided with two liquid crystal panels superimposed on each other, when panel pixel numbers of the two panels are the same, an input image signal is scaled to an input image signal having a display resolution of the panel pixel number. Display pixels of one frame of the input image signal correspond to panel pixels thereof on a one-to-one basis in both of the two panels. That is, in calculation of panel input gray scale data for panel pixels of one panel corresponding to input display gray scale data of a certain display pixel of an input image signal, the panel input gray scale data can be calculated considering only one corresponding panel pixel of the other panel. The display pixels and the corresponding panel pixels of the two panels correspond to each other on a one-to-one basis, and thus a combination of panel input gray scale data of panel pixels of one panel out of the two panels and panel input gray scale data of panel pixels of the other panel with respect to one piece of input display gray scale data can be easily narrowed down to one set according to the conditions determined.

On the other hand, in a liquid crystal display device provided with two liquid crystal panels superimposed on each other, in a case where panel pixel numbers of the two panels are different, it can be expected that scaling to a panel pixel number of a high resolution will be performed. In this case, in the calculation of panel input gray scale data for panel pixels of one panel corresponding to input display gray scale data of a certain display pixel of the scaled input image signal, there are a plurality of corresponding panel pixels of the other panel, and thus panel input gray scale data has to be calculated in consideration of all of the corresponding panel pixels. Thus, at least as many computing equations as the number of other corresponding panel pixels are required. In some cases, after panel pixel input gray scale data of a certain pixel is calculated, it may not be possible to match panel pixel input gray scale data of other panel pixels and the corresponding input display gray scale data. As a result, it is also assumed that an initial value for calculation may need to be changed and computation performed again.

As a result, in order to make display pixels on a display screen have a desired luminance by using such a liquid crystal display device, processing for calculating pieces of panel input gray scale data of panel pixels of each of two liquid crystal panels becomes complicated.

The disclosure has been made in view of the problem described above. An object of the disclosure is to reduce a circuit size or an information processing amount of software for executing processing for determining pieces of panel input gray scale data of panel pixels of each of two liquid crystal panels in a liquid crystal display device including two liquid crystal panels having different panel pixel numbers.

Solution to Problem (1) A liquid crystal display device according to the disclosure includes a first liquid crystal panel including a plurality of first pixels, a second liquid crystal panel provided to overlap the first liquid crystal panel, the second liquid crystal panel including a plurality of second pixels, each of the plurality of second pixels having a set of subpixels, and the second pixel having a size different from a size of the first pixel, and a control unit controlling the first liquid crystal panel and the second liquid crystal panel, in which the second liquid crystal panel includes a plurality of virtual opposing regions facing the plurality of first pixels with a one-to-one relationship, each of the plurality of virtual opposing regions includes two or more subpixels or includes one or more subpixels and a predetermined number of subpixel partial structures, the predetermined number of subpixel structures being a portion of a predetermined number of the subpixels, and for each of the plurality of virtual opposing regions, the control unit receives an input image signal including input display gray scale data corresponding to the virtual opposing regions, and selects a set of pieces of subpixel gray scale data corresponding to the virtual opposing regions from the input display gray scale data, extracts a maximum amount of subpixel gray scale data among the set of pieces of subpixel gray scale data as extracted gray scale data corresponding to one first pixel facing the virtual opposing regions among the plurality of first pixels, and controls a transmittance of light of the one first pixel using designated pixel gray scale data in a case where the extracted gray scale data has a level equal to or higher than an output determination reference gray scale level, the designated pixel gray scale data being gray scale data having a maximum transmittance of the first liquid crystal panel.

(2) A liquid crystal display device according to the disclosure may be the liquid crystal display device according to (1) described above, in which the control unit stores each piece of previously calculated selected gray scale data corresponding to each of a plurality of pieces of the extracted gray scale data in a case where the extracted gray scale data has a level lower than the output determination reference gray scale level, selects one piece of corresponding selected gray scale data in accordance with the extracted gray scale data from among the pieces of selected gray scale data, and controls a transmittance of light of the one first pixel by using the one piece of corresponding selected gray scale data.

(3) A liquid crystal display device according to the disclosure may be the liquid crystal display device according to (2) described above, in which the control unit receives an input image signal including input display gray scale data of a display pixel number, creates a downscaled image signal including a specific number of pieces of virtual input display gray scale data, the specific number of pieces of virtual input display gray scale data corresponding to the number of plurality of first pixels in the first liquid crystal panel but less than the display pixel number, by using the input display gray scale data corresponding to the display pixel number, extracts extracted gray scale data corresponding to the one first pixel from the specific number of pieces of virtual input display gray scale data, and determines, based on the extracted gray scale data, panel input gray scale data to be input to the one first pixel to be the designated pixel gray scale data or the corresponding one selected gray scale data.

(4) A liquid crystal display device according to the disclosure includes a first liquid crystal panel including a plurality of first pixels, a second liquid crystal panel provided to overlap the first liquid crystal panel, the second liquid crystal panel including a plurality of second pixels, each of the second pixels having a size different from a size of each of the first pixels, and each of the second pixels including subpixels, and a light diffusion sheet inserted between the first liquid crystal panel and the second liquid crystal panel.

(5) A liquid crystal display device according to the disclosure includes a first liquid crystal panel including a plurality of first pixels, a second liquid crystal panel provided to overlap the first liquid crystal panel, the second liquid crystal panel including a plurality of second pixels, each of the second pixels having a size different from a size of each of the first pixels, and each of the second pixels including subpixels, a backlight provided to overlap the first liquid crystal panel or the second liquid crystal panel, a brightness sensor detecting a brightness of a surrounding environment of the first liquid crystal panel and the second liquid crystal panel, and a backlight control unit reducing a brightness of the backlight in a case where the brightness of the surrounding environment detected by the brightness sensor is reduced.

(6) A liquid crystal display device according to the disclosure may be the liquid crystal display device according to (5) described above, in which when a first contrast value is set to be UCR, the first contrast value being a maximum transmittance/a minimum transmittance of the first liquid crystal panel, a second contrast value is set to be MCR, the second contrast value being a maximum transmittance/a minimum transmittance of the second liquid crystal panel, a maximum luminance value of the liquid crystal display device is set to be LUMA (cd/m$^2$), and a halo black sensitivity value is set to be ω=(LUMA/MCR−LUMA/MCR/UCR)/(SB/100) in a case where the brightness of the surrounding environment is set to be SB(1×), the backlight control unit controls the value of LUMA (cd/m$^2$) so that the halo black sensitivity value ω of the liquid crystal display device is set to be a value equal to or less than a specific value.

(7) A liquid crystal display device according to the disclosure may be the liquid crystal display device according to (5) or (6) described above, in which the backlight includes a plurality of light sources and is divided into a plurality of areas, each of the plurality of areas includes at least one of the plurality of light sources, and the backlight control unit individually controls lighting luminances of the plurality of areas based on an input image signal.

DETAILED DESCRIPTION

Figure 1:
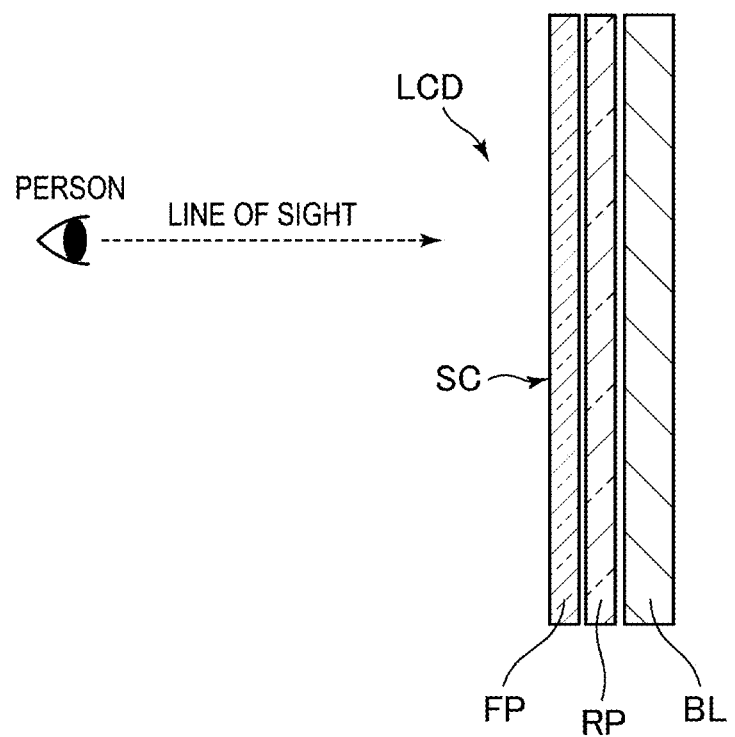
FIG. 1 is a schematic cross-sectional view of a liquid crystal display device according to a first embodiment.

Hereinafter, liquid crystal display devices according to embodiments of the disclosure will be described with reference to the accompanying drawings. Note that, in the drawings, the same or equivalent elements are denoted by the same reference numerals and signs, and repeated descriptions thereof will be omitted.

First Embodiment

A liquid crystal display device LCD according to a first embodiment will be described with reference to FIGS. 1 to 9.

First, the overall configuration of the liquid crystal display device LCD according to the first embodiment will be described with reference to FIGS. 1 to 3.

FIG. 1 is a schematic cross-sectional view of the liquid crystal display device LCD according to the first embodiment.

As illustrated in FIG. 1, the liquid crystal display device LCD includes a front panel FP, a rear panel RP, and a backlight BL. Each of the front panel FP and the rear panel RP includes a pair of polarizers that are not illustrated in the drawing.

The front panel FP, the rear panel RP, and the backlight BL are disposed so that two adjacent ones overlap each other. The front panel FP, the rear panel RP, and the backlight BL are arranged in this order from the front to the back. Note that it is assumed that a main outer surface of the front panel FP on a side opposite to a main surface overlapping the rear panel RP is a display screen SC where an image is viewed. The display screen SC is not an actual object, but is a surface where virtual display is viewed.

As illustrated in FIG. 1, the front panel FP, the rear panel RP, and the backlight BL are arranged in this order from the side of a person who is viewing an image on the display screen SC of the liquid crystal display device LCD.

In other words, description will be given as follows. First, light emitted from the backlight BL, which is a surface light source, passes through the rear panel RP. In the rear panel RP, a plurality of pixels capable of controlling a transmittance are arranged on one surface in a matrix. Thereafter, when the light passes through the rear panel RP, the luminance of the light emitted from the backlight BL decreases in each pixel of the rear panel RP in accordance with the transmittance of the pixel transmitting the light. The light having passed through the rear panel RP subsequently passes through the front panel FP. Also in the front panel FP, a plurality of pixels capable of controlling a transmittance are arranged on one surface in a matrix. At this time, the luminance of the light having passed through the front panel FP decreases at each pixel PF of the front panel FP in accordance with the transmittance of the pixel PF transmitting the light. In addition, the light having passed through the front panel FP is viewed by a person as an image displayed on the display screen SC of the liquid crystal display device LCD.

Both the front panel FP and the rear panel RP are liquid crystal panels. In the present specification, the rear panel RP may be referred to as a first liquid crystal panel. In addition, the front panel FP may be referred to as a second liquid crystal panel.

Although not illustrated in the drawing, each of the front panel FP and the rear panel RP includes a liquid crystal layer interposed between two glass substrates. The two glass substrates and the interposed liquid crystal layer form a glass substrate/liquid crystal layer/glass substrate structure, and the glass substrate/liquid crystal layer/glass substrate structures is interposed between two polarizers.

Figure 2:
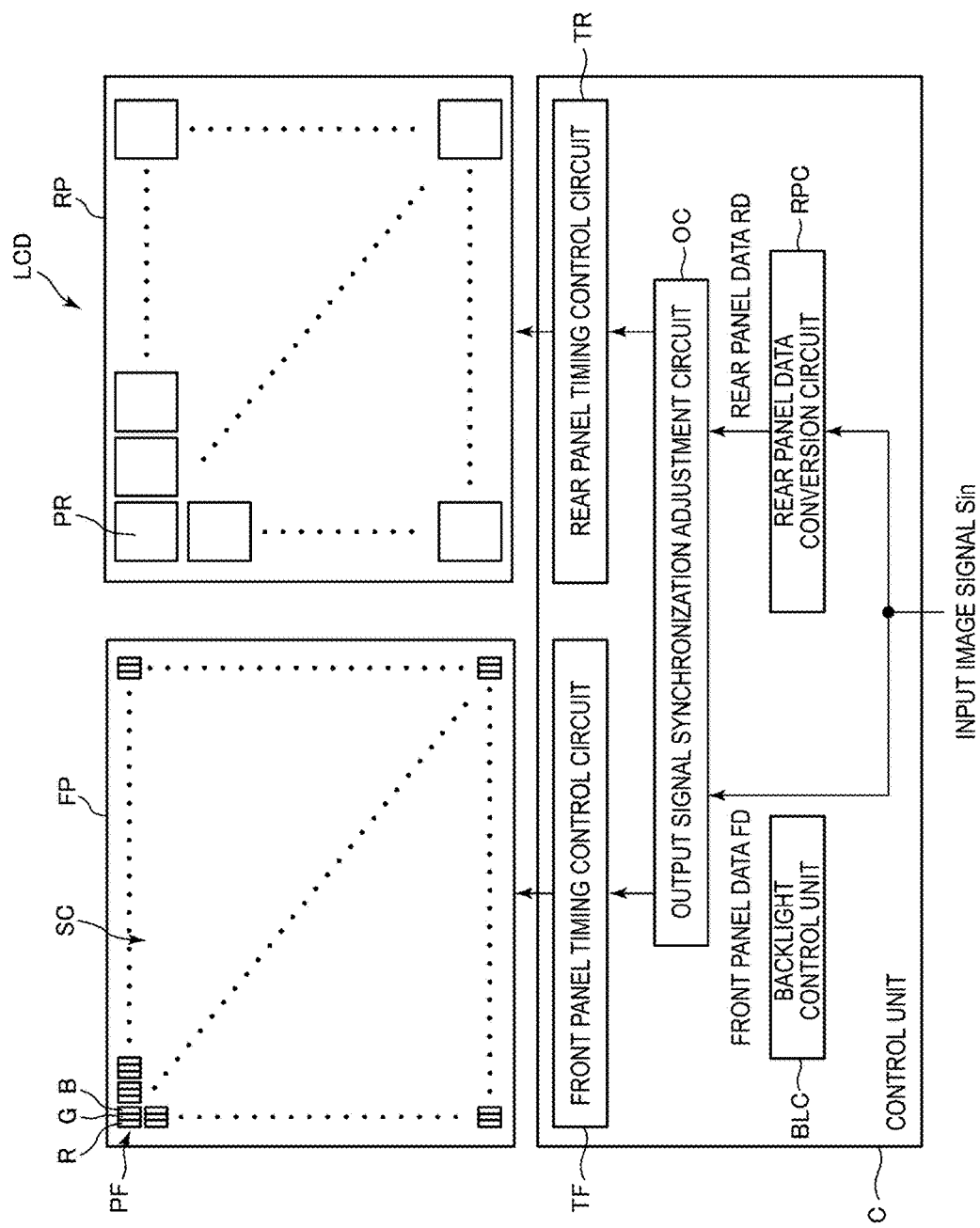
FIG. 2 is a block diagram illustrating configurations of a front panel, a rear panel, and a control unit of the liquid crystal display device according to the first embodiment.

FIG. 2 is a block diagram illustrating configurations of the front panel FP, the rear panel RP, and a control unit C of the liquid crystal display device LCD according to the first embodiment.

As illustrated in FIG. 2, the front panel FP includes the pixels PF disposed in a matrix. Each pixel PF includes a subpixel R having a red color filter, a subpixel G having a green color filter, and a subpixel B having a blue color filter.

However, the number of one set of subpixels constituting the colors of one pixel PF is not limited to three, and may be four or more. In addition, the color types of the color filters corresponding to each set of subpixels constituting the colors of one pixel PF are not limited to the above-described three colors of red, green, and blue. On the other hand, the rear panel RP also includes pixels PR disposed in a matrix. However, none of the pixels PR constituting the rear panel RP includes a color filter.

Note that the front panel FP need not include a color filter, and the rear panel RP may include a color filter. In this case, one pixel PR of the rear panel RP includes one set of subpixels, and the set of subpixels includes color filters of different colors.

In both the front panel FP and the rear panel RP, a liquid crystal layer is interposed between two glass substrates, and each of the two glass substrates includes an electrode on a surface on a side in contact with the liquid crystal layer. The electrode included in the glass substrate on the front panel FP side out of the two glass substrates is formed such that a different voltage is applied to each subpixel. Further, the electrode included in the glass substrate on the rear panel RP side out of the two glass substrates is formed such that a different voltage is applied to each pixel.

For this reason, the control unit C illustrated in FIG. 2 can individually control transmittances of all subpixels included in the front panel FP, and can individually control transmittances of all pixels included in the rear panel RP. Thus, in the front panel FP, the control unit C can control the transmittance of a subpixel of any portion in a display region independently from the rest of the display region. Further, in the rear panel RP, the transmittance of a pixel PR of any portion in a display region can be controlled independently from the rest of the display region. Details of the control unit C will be described below.

When a potential difference between opposing electrodes in the subpixel of the front panel FP is controlled for each subpixel, the transmittance of light passing through the front panel FP can be controlled independently for each of the subpixels R, G, and B of the front panel FP. Thus, it is possible to control the color of light transmitted by each of the pixels PF of the front panel FP. On the other hand, in the rear panel RP, when a potential difference between opposing electrodes in each pixel PR is individually controlled, the transmittance of light can be controlled for each pixel PR.

As illustrated in FIG. 2, the liquid crystal display device LCD includes the control unit C. The control unit C includes a front panel timing control circuit TF that controls the front panel FP on the basis of front panel data FD. The control unit C includes a rear panel timing control circuit TR that controls the rear panel RP on the basis of rear panel data RD.

The control unit C includes an output signal synchronization adjustment circuit OC. The output signal synchronization adjustment circuit OC synchronizes the front panel data FD transmitted to the front panel timing control circuit TF with the rear panel data RD transmitted to the rear panel timing control circuit TR.

The control unit C receives an input image signal Sin including one piece of display image data for each frame. In the control unit C, the received input image signal Sin is divided into two systems and processed. The input image signal Sin of the processing of one system is transmitted as the front panel data FD to the front panel timing control circuit TF via the output signal synchronization adjustment circuit OC. In addition, the input image signal Sin of the other system is converted into the rear panel data RD by a rear panel data conversion circuit RPC. The converted rear panel data RD is transmitted to a rear panel timing control circuit TR via the output signal synchronization adjustment circuit OC.

Note that the control unit C includes a backlight control unit BLC that controls the backlight BL.

Figure 3:
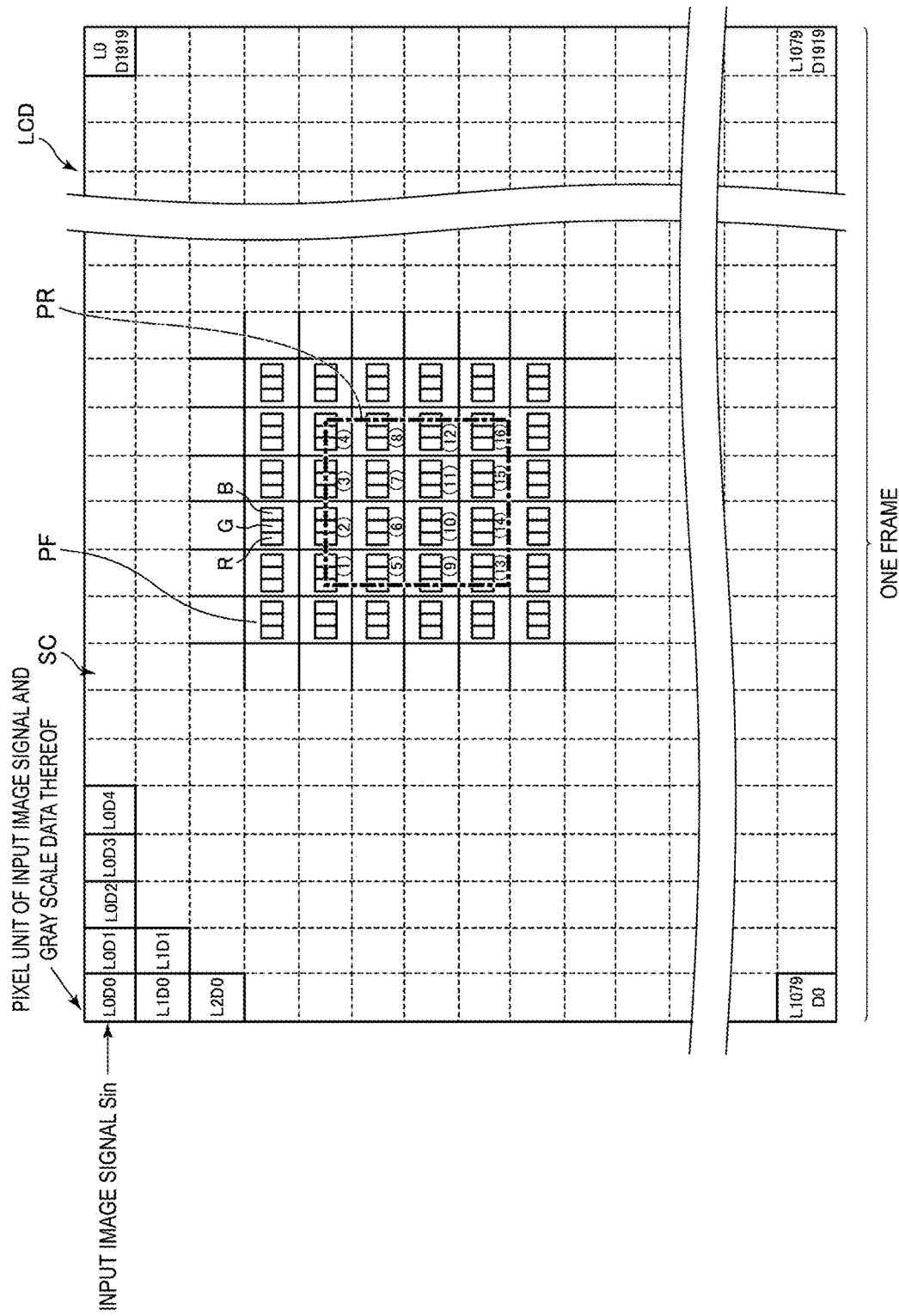
FIG. 3 is a schematic plan view illustrating a configuration of pixels and subpixels of the front panel of the liquid crystal display device according to the first embodiment, a positional relationship between subpixels of the front panel in a virtual opposing region facing a certain pixel of the rear panel, and arrangement of input image signals and gray scale data. Note that the virtual opposing region is a region surrounded by an alternating dotted-dashed line in FIG. 3.

FIG. 3 is a schematic plan view of the liquid crystal display device LCD according to the first embodiment, the schematic plan view illustrating a relationship between display pixel units of an input image signal and the pixels PF of the front panel FP and schematically representing arrangement of input display gray scale data of the display pixel. In addition, FIG. 3 illustrates the configuration of one set of subpixels R, G, and B of the front panel FP and a positional relationship between a certain pixel PR of the rear panel RP and the subpixels R, G, and B of the front panel FP.

As illustrated in FIG. 3, the size of the pixel PR of the rear panel RP is larger than the size of the pixel PF of the front panel FP. The smaller the size of a liquid crystal panel, the lower an aperture ratio and the lower a maximum transmittance thereof. Thus, the efficiency of light is improved by adopting a panel having a large pixel size as a rear panel, rather than adopting the same pixel size. Further, regarding the liquid crystal panel, a mask is used in the manufacture thereof, and when pixel sizes are different, different pixels have to be manufactured using different masks. Thus, the panel can be manufactured at a low cost by using a pixel size that has already been used.

Thus, the pixel size of the rear panel RP is required to be larger than the pixel size of the front panel FP, and an appropriate pixel size is selected from among existing pixel sizes. However, when the pixel size of the rear panel RP is excessively large, a region for contrast control is increased, and desired control cannot be performed. For the above-described reason, the pixel size of the rear panel RP is selected.

In the case of the first embodiment, as illustrated in FIG. 3, the pixel size of the pixel PR of the rear panel RP is not an integer multiple of the pixel size of the pixel PF of the front panel FP.

The size of the pixel PR of the rear panel RP is not limited to an integer multiple of the size of the pixel PF of the front panel FP in both the vertical direction and the horizontal direction. That is, in a relationship between the pixel PF of the front panel FP and the pixel PR of the rear panel RP which overlap each other, a ratio of the size of the pixel PR of the rear panel RP to the size of the pixel PF of the front panel FP need not be an integer.

For example, one pixel PR of the rear panel RP may be disposed to overlap 16 subpixels of 4×4 of the front panel FP. Further, the size ratio of the pixel PR of the rear panel RP to the subpixel of the front panel FP need not be an integer. For example, six pixels PR of 3×2 of the rear panel RP may be disposed to face 65 subpixels of 13×5 of the front panel FP. Further, a front panel display area, which is the surface area of all pixels of the front panel FP, and a rear panel display area, which is the surface area of all pixels of the rear panel RP, need not be identical.

The luminance of a display surface of an image displayed on the liquid crystal display device LCD according to the first embodiment will be described.

The backlight BL, which is a surface light source, emits light to a backlight surface along a vertical direction with a uniform luminance in an in-plane direction. The actual light propagates with some diffusion, but description will be given here assuming that the light of the surface light source travels in a straight line.

In the rear panel RP, the pixels PR are disposed in a matrix on one surface of the panel. In the front panel FP, the pixels PF are disposed in a matrix over the entire surface thereof. A certain pixel PR of the rear panel RP and a certain pixel PF of the front panel FP which are in a direction perpendicular to a light emitting surface from the position (x, y) of the backlight BL within a light emitting surface are assumed to be a pixel PR (x, y) and a pixel PF (x, y), respectively. At this time, a lower left position toward the light emitting surface of the backlight BL is assumed to be a position (0, 0).

Light with a certain light emission luminance which is emitted from the position (x, y) within the light emitting surface of the backlight BL passes through the pixel PR (x, y) of the rear panel RP, then passes through the pixel PF (x, y) of the front panel FP, and is emitted from the display screen SC. When light emitted from the position (x, y) of the backlight BL within the light emitting surface passes through the pixel PR (x, y) of the rear panel RP, the luminance of the light decreases depending on the transmittance of the pixel PR (x, y) through which the light passes. In addition, when light attenuated by passing through the pixel PR (x, y) passes through the pixel PF (x, y) of the front panel FP, the luminance of the light decreases depending on the transmittance of the pixel PF (x, y) through which the light passes.

Here, a value in which a transmittance is normalized so that a maximum value of the transmittance of each of the front panel FP and the rear panel RP is set to 1 is assumed to be a normalized transmittance. At this time, the luminance of a display position (x, y) on the display screen SC of the liquid crystal display device LCD is approximately proportional to a value calculated by multiplying a normalized transmittance of the pixel PF (x, y) of the front panel FP through which the light passes by a normalized transmittance of the pixel PR (x, y) of the rear panel RP.

Thus, compared with a liquid crystal display device configured using only one liquid crystal panel, the liquid crystal display device LCD configured using two liquid crystal panels superimposed on each other has a higher contrast of display on the display screen SC. As a result, the liquid crystal display device LCD performing display by using two overlapping liquid crystal panels can realize display in a high dynamic range.

In the liquid crystal display device LCD according to the first embodiment, the front panel FP includes a color filter and is constituted by a liquid crystal panel having a pixel PF of the front panel FP having a size smaller than that of a pixel PR of the rear panel RP. Additionally, the rear panel RP does not include a color filter and is constituted by a liquid crystal panel having a pixel PR of the rear panel RP having a size larger than that of a pixel PF of the front panel FP.

However, the configuration of the pixel PF of the front panel FP and the configuration of the pixel PR of the rear panel RP may be swapped with each other. In other words, the front panel FP need not include a color filter and may be constituted by a liquid crystal panel having a pixel PF of the front panel FP having a size larger than that of a pixel PR of the rear panel RP.

In addition, the rear panel RP may include a color filter and may be constituted by a liquid crystal panel having a pixel PR of the rear panel RP having a size smaller than that of a pixel PF of the front panel FP. In this case, the control of the front panel FP and the control of the rear panel RP to be described below are swapped with each other.

Note that, in any of the cases, the pixels PF of the front panel FP which are disposed in a matrix of the front panel FP have the same size. In addition, the pixels PR of the rear panel RP which are disposed in a matrix of the rear panel RP have the same size.

A digital image signal which is input to a display device (product) is also input to the display device in a signal format conforming to each normalized signal format as an encoded signal for further transmission. After the digital image signal input to the display device is decoded, the resolution of the decoded digital image signal is converted by a scaler in accordance with a panel resolution of the device, that is, is converted into input display gray scale data for each pixel, which becomes the panel resolution, and is then transmitted to the panel.

In addition, since there are many resolution standards for monitors and the like used in PCs, a display pixel number of an input image signal input to a display device such as a PC monitor is often different from a panel pixel number used in a display device. On the other hand, an input display pixel number of the input image signal Sin which is input to the control unit C illustrated in FIG. 2 is the same as a panel pixel number of the front panel FP. In other words, although not illustrated in FIG. 2, the input image signal Sin is a signal after the input image signal input to the display device is converted by the scaler so as to have the same panel pixel number as the panel pixel number of the front panel FP at a stage before being input to the control unit C.

An output timing of the input display gray scale data corresponding to the display pixel number included in the input image signal Sin is adjusted by the output signal synchronization adjustment circuit OC. Consequently, a signal for the front panel and a signal for the rear panel are synchronized with each other so that display timings thereof coincide with each other. After the adjustment of the signal timing, the input display gray scale data corresponding to the display pixel number included in the input image signal Sin is transmitted to the front panel FP as panel input gray scale data for each pixel PF of the front panel FP via the front panel timing control circuit TF.

As illustrated in FIG. 2, in the first embodiment, the input image signal Sin is divided into two systems in the control unit C and is processed in each of the two systems.

One of two input image signals Sin separated into two systems is input to the rear panel data conversion circuit RPC illustrated in FIG. 2. The rear panel data conversion circuit RPC converts each input display gray scale data included in the input image signal Sin into rear panel data RD and transmits the converted rear panel data RD to the output signal synchronization adjustment circuit OC.

As described above, a display pixel number of the input image signal Sin is the same as a panel pixel number of the front panel FP, and is different from a panel pixel number of the rear panel RP. Thus, the control unit C refers to input display gray scale data of some input display pixels in the conversion into rear panel data RD of one pixel in the rear panel data conversion circuit RPC.

In this conversion method, panel input gray scale data for any one pixel PR of the rear panel RP is calculated by referring to input display gray scale data of all input display pixels in a virtual opposing region facing the one pixel PR. Note that the input display gray scale data includes data of subpixels. The subpixels in this case also include subpixels in which only a portion thereof is included in the virtual opposing region. This conversion method will be described later in detail.

The rear panel data conversion circuit RPC may perform the following data conversion. First, in terms of data conversion for one pixel PR of the rear panel RP, the rear panel data conversion circuit RPC temporarily performs all the above-described data conversion for the pixel PR of the rear panel RP also including data conversion for the other pixels PR of the rear panel RP.

After the conversion processing, the rear panel data conversion circuit RPC finally performs conversion into panel input gray scale data for the one pixel PR of the rear panel RP, that is, into rear panel data RD corresponding to the one pixel PR, with reference to conversion data of eight pixels PR of the rear panel RP which surround the one pixel PR of the rear panel RP.

For example, the rear panel data conversion circuit RPC calculates an average value or a median value of nine pieces of gray scale data. The nine pieces of gray scale data include gray scale data converted for one pixel PR of the rear panel RP and gray scale data converted for eight pixels PR of the rear panel RP which surround the one pixel PR of the rear panel RP. Thereafter, the rear panel data conversion circuit RPC may set final panel input gray scale data as the one rear panel data RD.

The other signal out of the two input image signals Sin separated into two systems is input to the output signal synchronization adjustment circuit OC as front panel data FD without converting each of the values of the input display gray scale data of the display pixel number.

The front panel data FD and the rear panel data RD are input to the output signal synchronization adjustment circuit OC. The output signal synchronization adjustment circuit OC outputs the front panel data FD and the rear panel data RD to the front panel timing control circuit TF and the rear panel timing control circuit TR, respectively. At this time, the output signal synchronization adjustment circuit OC synchronizes output timings of the front panel data FD and the rear panel data RD with each other.

Thus, the front panel data FD and the rear panel data RD are subjected to output synchronization so that display on the two panels, that is, the front panel FP and the rear panel RP is simultaneously performed. The front panel data FD and the rear panel data RD output from the output signal synchronization adjustment circuit OC are input to the front panel timing control circuit TF and the rear panel timing control circuit TR, respectively.

Next, a method in which the rear panel data conversion circuit RPC illustrated in FIG. 2 converts the input image signal Sin into the rear panel data RD will be described with reference to FIG. 3. Reference is made to all pieces of input display subpixel gray scale data corresponding to subpixels of input display pixels within a virtual opposing region facing one pixel PR of the rear panel. One piece of panel input gray scale data input to the pixel PR is determined using the input display subpixel gray scale data. Note that the subpixels also include subpixels in which only a portion thereof is included in the virtual opposing region. A portion of the subpixels included in the virtual opposing region is referred to as a subpixel partial structure.

In addition, the following description will be given using FIG. 3.

A correspondence relationship between input display gray scale data of input display pixels included in an input image signal Sin and panel input gray scale data of pixels PF of the front panel FP will be described including a correspondence relationship with subpixel gray scale data. Further, a correspondence relationship between input display gray scale data of input display pixels included in an input image signal Sin and pixels PR of the rear panel RP and a corresponding relationship with subpixels of pixels PF of the front panel FP will be described. In addition, data arrangement for the rear panel RP will be described.

Further, in order to convert input display gray scale data of input display pixels included in the input image signal Sin into panel input gray scale data of the pixels PR of the rear panel RP, a correspondence relationship with a virtual opposing region (for example, a region surrounded by an alternating dotted-dashed line in FIG. 3) facing the pixels PR of the rear panel RP to be referred to will be described. In addition, in the data conversion, the arrangement of subpixels of the front panel FP facing the virtual opposing region to be referred to will be described. Further, a method for selecting extracted gray scale data used for the data conversion from among the input display gray scale data referred to will be described.

In this description, specific numerical values are used for convenience of explanation. However, numerical values that may be used in the disclosure are not limited to the specific numerical values shown below.

FIG. 3 is illustrated under the assumption that the resolution of an input image signal Sin is full high definition (FHD), that is, 1920 (H)×1080 (V). Further, it is assumed that the gray scale number of each subpixel is one of 256 levels of 8 bits.

FIG. 3 illustrates the arrangement of input display pixels constituting one frame of an input image signal Sin and the arrangement of input display gray scale data corresponding to the display pixel arrangement.

The input image signal Sin includes input display gray scale data of each input display pixel of each frame. Input display gray scale data of each input display pixel in any one frame of the input image signal Sin is configured as illustrated in FIG. 3. In FIG. 3, pieces of input display gray scale data for display pixels of an uppermost line are defined as L0D0, L0D1, L0D2, . . . , and L0D1919. Since an input display pixel number and a panel pixel number of the front panel FP are the same, the pieces of input display gray scale data correspond to the pixels PF disposed in the uppermost line of the front panel FP on a one-to-one basis as illustrated in FIG. 3.

In FIG. 3, pieces of input display gray scale data corresponding to input display pixels of one line below the uppermost line are defined as L1D0, L1D1, L1D2, . . . , and L1D1919. Pieces of input display gray scale data corresponding to input display pixels of the lowermost line are defined as L1079D0, L1079D1, L1079D2, and L1079D1919.

Pieces of input display gray scale data corresponding to input display pixels of each frame correspond to the pixels PF of the front panel FP in each frame on a one-to-one basis. Note that each of the pieces of input display gray scale data corresponding to the pixels PF of the front panel FP includes subpixel gray scale data corresponding to subpixels of each pixel PF.

Input display gray scale data LxDy (0≤x≤1079, 0≤y≤1919) constituting the input image signal Sin includes pieces of input display subpixel gray scale data of a subpixel R, a subpixel G, and a subpixel B. The input display subpixel gray scale data of each of the subpixel R, the subpixel G, and the subpixel B is data having a data length of 8 bits.

In other words, when the input display subpixel gray scale data of the subpixel R is assumed to be LxDy_R, the input display subpixel gray scale data of the subpixel G is assumed to be LxDy_G, and the input display subpixel gray scale data of the subpixel B is assumed to be LxDy_B, LxDy_R (0≤x≤1079, 0≤y≤1919)=0 to 255, LxDy_G (0≤x≤1079, 0≤y≤1919)=0 to 255, and LxDy_B (0≤x≤1079, 0≤y≤1919) =0 to 255.

The panel pixel number of the rear panel RP illustrated in FIG. 3 is 576 (H)×324 (V). With respect to one pixel PR of the rear panel RP among the pieces of input display gray scale data of the display pixels included in the input image signal Sin of one frame, 3.33 pieces of input display gray scale data correspond thereto in each of the vertical direction and the horizontal direction.

For this reason, as illustrated in FIG. 3, one pixel PR of the rear panel RP overlaps 3.33 input display pixels in each of the vertical direction and the horizontal direction. In other words, one pixel PR of the rear panel RP overlaps subpixels of 3.33 input display pixels in the vertical direction and overlaps 10 subpixels of the input display pixels in the horizontal direction.

Regarding data transmitted to the pixels PR of the rear panel RP which are disposed in a matrix, panel input gray scale data of each pixel PR is set as follows.

For example, as panel input gray scale data of the pixels PR of the uppermost line of the rear panel RP, UL0D0, UL0D1, UL0D2, . . . , and UL0D639 are set. In addition, as panel input gray scale data of pixels PR of a second line from the top of the rear panel RP, UL1D0, UL1D1, UL1D2, . . . , and UL1D639 are set. The set panel input gray scale data for each pixel PR of the rear panel RP is transmitted to the rear panel RP from UL0D0 in order from the uppermost line to the lowermost line.

In FIG. 3, for example, the pixel PR of the rear panel RP at the left end of the uppermost line of the rear panel RP overlaps subpixels described in the following (A) to (C) of input display pixels.

(A) First three pixels PF, second three pixels PF, and third three pixels PF (nine in total: three subpixels R, three subpixels G, and three subpixels B) from the respective left ends of the uppermost line, the second line from the top, and the third line from the top (B) A subpixel (any one of subpixels R, G, and B) at the leftmost end in the fourth pixel PF from the left of each of the uppermost line, the second line from the top, and the third line from the top Note that which one of the subpixel R, the subpixel G, and the subpixel B the subpixel constituting the fourth pixel PF is depends on an arrangement configuration of the subpixels in the pixels PF of the front panel FP. Regarding the arrangement configuration of the subpixels of the pixels PF of the front panel according to the first embodiment, the subpixels are arranged in the order of R, G, and B.

(C) An upper one third region (one third region=subpixel partial structure) (a total of nine regions) of each of the subpixels R, G, and B constituting three input display pixels from the left end of the fourth line from the top, and an upper one third region (a total of one region: any one of subpixels R, G, and B) of the subpixel at the left end of the fourth input display pixel from the left end of the fourth line from the top Thus, in a case where the rear panel data conversion circuit RPC performs conversion into panel input gray scale data UL0D0 (a pixel PR at the left end of the uppermost horizontal line) as rear panel data RD by using some pieces of input display gray scale data included in an input image signal Sin, input display gray scale data of 16 input display pixels shown below is used. That is, in this case, input display subpixel gray scale data of 40 subpixels is used.

L0D0, L0D1, L0D2, L0D3_R
L1D0, L1D1, L1D2, L1D3_R
L2D0, L2D1, L2D2, L2D3_R
L3D0, L3D1, L3D2, L3D3_R

Note that, in a case where the input display gray scale data used for the above-described conversion includes only subpixels, a suffix _such as R, _G, or _B indicating the color of a subpixel is attached to the end of the input display gray scale data.

In addition, a case where the rear panel data conversion circuit RPC performs conversion into the panel input gray scale data UL0D1 (gray scale data corresponding to the second pixel PR of the rear panel RP from the left end of the uppermost horizontal line) as the rear panel data RD by using some pieces of input display gray scale data of the input image signal Sin is examined. In this case, input display subpixel gray scale data of 40 subpixels shown below is used.

L0D3_G, B, L0D4, L0D5, L0D6_R, G
L1D3_G, B, L1D4, L1D5, L1D6_R, G
L2D3_G, B, L2D4, L2D5, L2D6_R, G
L3D3_G, B, L3D1, L3D5, L3D6_R, G

In FIG. 3, a case where the resolution of the front panel FP and a panel pixel number of the rear panel RP are different is assumed. In this case, in order to estimate panel input gray scale data of one pixel PR of the rear panel RP, input display subpixel gray scale data (included in the input image signal Sin) of all subpixels in a virtual opposing region (for example, a region surrounded by an alternating dotted-dashed line in FIG. 3) facing the pixel PR of the rear panel RP is required.

The rear panel data conversion circuit RPC extracts gray scale data having the largest value from the input display subpixel gray scale data of all subpixels in the virtual opposing region facing one pixel PR of the rear panel RP described above. In addition, the rear panel data conversion circuit RPC selects the extracted gray scale data as gray scale data used for conversion into panel input gray scale data of the pixels PR of the rear panel RP. In the present specification, the extracted gray scale data is referred to as extracted gray scale data.

In FIG. 3, an example of a region facing the pixels PR of the rear panel RP is indicated by a dashed frame. In the dashed frame, display pixels (1) to (16) are shown. A simple example of estimation of the above-described extracted gray scale data for the pixels PR of the rear panel RP will be described.

For example, it is assumed that all values of input display subpixel gray scale data of subpixels included in the input display pixels indicated by (1) to (16) except for (7) in FIG. 3, among subpixels constituting the input display pixels indicated by (1) to (16) in FIG. 3, are 0.

In addition, it is assumed that the values of input display subpixel gray scale data of the other subpixels other than the subpixel G included in the input display pixel indicated by (7) in FIG. 3 are also 0.

On the other hand, it is assumed that the value of input display subpixel gray scale data of the subpixel G constituting the input display pixel indicated by (7) in FIG. 3 is 128. In this case, the value of the extracted gray scale data described above is 128.

Next, a method of determining panel input gray scale data which is input to pixels of each of the front panel FP and the rear panel RP from the above-described extracted gray scale data during the processing of the control unit C according to the first embodiment will be described with reference to FIGS. 4 to 7.

Characteristics of a transmittance when two panels are superimposed on each other will be described.

Figure 4:
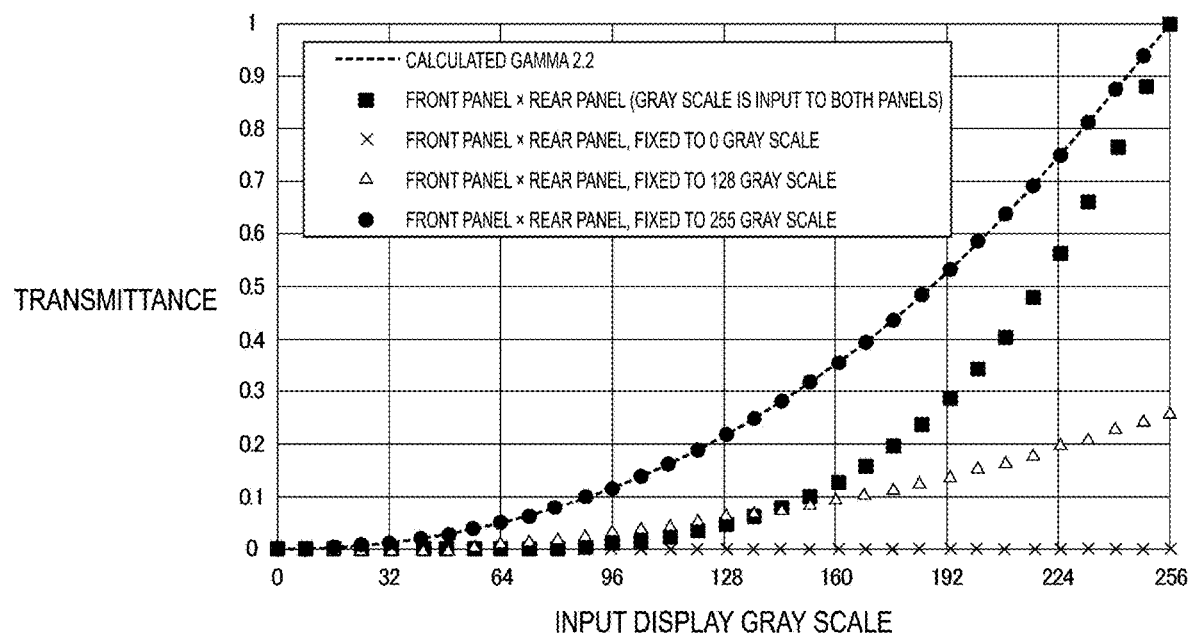
FIG. 4 is a graph showing a relationship between an input display gray scale and a transmittance for some combinations of panel input gray scale data (a value corresponding to the input display gray scale) input to each of two panels.
Figure 5:
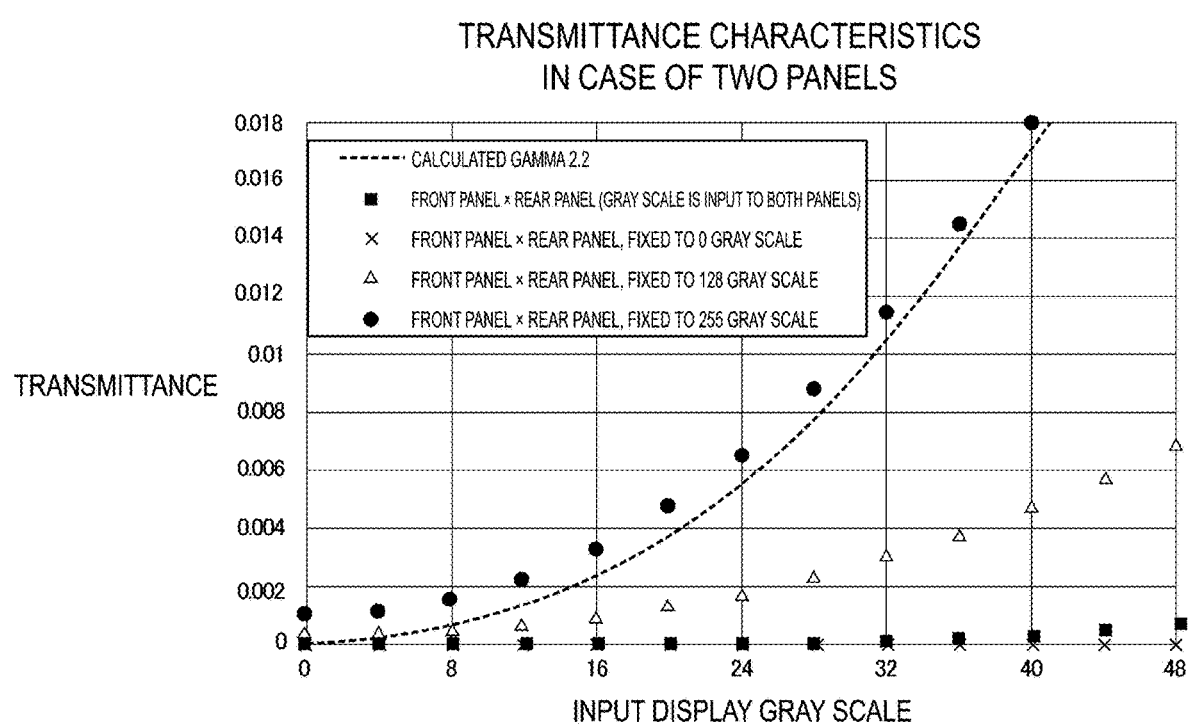
FIG. 5 is an enlarged view of a portion of the graph in FIG. 4.

FIG. 4 is a graph showing a relationship between an input display gray scale of an input image signal and a transmittance in a case where two panels including the front panel FP and the rear panel RP are combined. FIG. 5 is an enlarged view of a portion of the graph in FIG. 4.

The value of a transmittance value illustrated in each of FIGS. 4 and 5 is not a value representing an attenuation rate of the actual luminance value once light has passed through the two panels, but rather indicates a ratio of luminance transmittance with respect to a maximum transmittance of light having passed through the two panels when the maximum transmittance of the two panels is set to 1.

In FIGS. 4 and 5, in order to show characteristics of a transmittance for an input display gray scale as basic characteristics, a graph of a transmittance when the same input display gray scale data is input to display pixels including subpixels is illustrated.

Further, in the graphs of FIGS. 4 and 5, regarding panel input gray scale data input to the front panel FP, it is assumed that each input display gray scale data is input to each subpixel of the front panel FP without being converted. Further, regarding input gray scale data input to the rear panel RP, FIGS. 4 and 5 illustrate a case where some fixed values are input and a case where input display gray scale data is input as is. In both the front panel FP and the rear panel RP, the transmittance in a single panel is set to have a characteristic of $\gamma=2.2$ with respect to the input display gray scale data.

In FIGS. 4 and 5, a dashed line indicates a value where a relationship between input display gray scale data and transmittance is $\gamma=2.2$.

In FIGS. 4 and 5, the value of a panel input gray scale for each pixel PR of the rear panel RP corresponds to any one of the following four cases of (i) to (iv). The graphs in FIGS. 4 and 5 show a relationship between input display gray scale and transmittance of light having passed through two panels in each of the four cases.

(i) Black square (■): A case where input display gray scale data is input to the pixel PR of the rear panel RP as input gray scale data of the pixel PR (ii) Cross (x): A case where gray scale data of 0 gray scale (fixed value) is input to the pixel PR of the rear panel RP as input gray scale data of the pixel PR (iii) White triangle (Δ): A case where gray scale data of 128 gray scale (fixed value) is input to the pixel PR of the rear panel RP as input gray scale data of the pixel PR (iv) Black circle (●): A case where gray scale data of 255 gray scale (fixed value) is input to the pixel PR of the rear panel RP as input gray scale data of the pixel PR Note that the data of the graphs shown in FIGS. 4 and 5 are created under the following conditions.

For any of the front panel FP and the rear panel RP, a contrast, that is, a ratio between a maximum transmittance and a minimum transmittance is 1000:1. For this reason, in a case where the front panel FP and the rear panel RP are combined, a contrast of a set of the two panels is 1000000:1. A bit width of the input display gray scale data input to the control unit C is 8 bits, and the maximum gray scale value is 255 gray scale.

As shown in FIG. 4, the black circle (●) is on the dashed line of $\gamma=2.2$. The black circle (●) indicates a transmittance in a case where input display gray scale data is input to the front panel FP, and data of 255 gray scale (fixed value) is input to the rear panel RP. The graph of the transmittance indicated by the black circle (●) is assumed to be a first graph. On the other hand, the graph of the transmittance showing characteristics of $\gamma=2.2$ indicated by the dashed line in FIG. 4 is assumed to be a second graph. In this case, it can be understood that the first graph is extremely similar to the second graph.

Note that γ is a value indicating characteristics of display, and is a value indicating a relationship between input value (gray scale data) and output value (luminance value). In the case of a liquid crystal display device, an output luminance of the backlight BL is controlled by the transmittance of pixels of the liquid crystal panel, and thus a luminance value serving as the output value depends on the transmittance of the liquid crystal panel. That is, since a relationship of an output value (luminance value)=a backlight luminance (fixed in this case)×a panel transmittance is established, and thus γ indicates a relationship between input display gray scale data and the transmittance thereof in the case of a liquid crystal panel.

More specifically, a relationship between an input value (gray scale data) and an output value (transmittance) is a relationship referred to as a gamma curve indicated by a transmittance (output value) Vout=K×gray scale data (input value) Vin$^\gamma$ in a case where the minimum transmittance is set to 0 and the maximum transmittance is set to 1. The index γ of the power in this case is referred to as a gamma value. Here, when the coefficient K is a value represented by K=1/M$^\gamma$ when the value of the maximum gray scale (255 in the case of 8 bits) is assumed to be M.

As shown in FIG. 5, in a case where gray scale data smaller than 48 gray scale is input as input display gray scale data, the first graph represented by the black circle ● moves away from the second graph indicating characteristic of γ=2.2 which is represented by the dashed line as the input display gray scale data decreases. A difference between the value of a transmittance in the first graph and the value of a transmittance in the second graph is approximately one gray scale difference when the input display gray scale data is 32 gray scale, and the difference increases as the value of the input display gray scale data becomes smaller.

Although it is difficult to discern from FIG. 4, a difference from the second graph having the above-described characteristics of γ=2.2 is a luminance difference equivalent to approximately 0.5 gray scale when the input display gray scale data is 64 gray scale. The luminance difference equivalent to 0.5 gray scale also depends on a maximum luminance of a liquid crystal display device, but it is difficult for a person to distinguish a luminance difference equivalent to 0.5 gray scale on the display screen SC of the liquid crystal display device LCD.

A value of the input display gray scale data, which is a boundary between a value equal to or greater than the luminance difference equivalent to 0.5 gray scale and a value equal to or less than the luminance difference equivalent to 0.5 gray scale from the characteristics of γ, such as the value of 64 gray scale obtained as described above, will be hereinafter referred to as an output determination reference gray scale level.

Considering the above-described characteristics shown in FIGS. 4 and 5, the following can be said.

Here, a technique for determining panel input gray scale data which is input to pixels or subpixels of each of two panels such that a transmittance of γ=2.2 corresponding to an input display gray scale is output for the input display gray scale is used. In this technique, when extracted gray scale data has a level equal to or higher than an output determination reference gray scale level, panel input gray scale data for one target pixel PR of the rear panel RP may be converted to a maximum gray scale of, for example, 255 in the case of 8 bits. On the other hand, panel input gray scale data for each target subpixel in a virtual opposing region of the front panel FP (for example, the region surrounded by the alternating dotted-dashed line in FIG. 3) may be set to have the value of input display gray scale data of each target input display pixel.

A specific calculation method for converting the above-described extracted gray scale data to selected gray scale data will be described. For ease of description, regarding a method of calculating panel input gray scale data input to each panel, the description of a calculation method in a case where the same input display gray scale data is input to display pixels including subpixels will be continued.

In a case where two panels, that is, the front panel FP and the rear panel RP are superimposed on each other, the maximum transmittance when the two panels are superimposed on each other is assumed to be DTmax, and the minimum transmittance when the two panels are superimposed on each other is assumed to be DTmin. In this case and when a γ-characteristic for input display gray scale data L is set to be γ=2.2, a transmittance Tdua(L) of the two panels is represented by an equation of $$Tdua(L)=((L^{\wedge}2.2)/(255^{\wedge}2.2))\times(DTmax-DTmin)+Dtmin \quad (1).$$

The maximum transmittance of the front panel FP is assumed to be Tmax, the minimum transmittance of the front panel FP is assumed to be Tmin, and the γ-characteristic of the front panel FP is assumed to be γ=2.2. In this case, when the input display gray scale data L (0≤L≤255) is input to the front panel FP, a transmittance Tmae(L) of the front panel FP is represented by an equation of $$Tmae(L)=((L^{\wedge}2.2)/(255^{\wedge}2.2))\times(Tmax-Tmin)+Tmin \quad (2).$$

When the input display gray scale L is input to the front panel, a transmittance Tusi* of the rear panel RP required to set the transmittance of the two superimposed panels to be Tdua(L) is represented by the following formula.

$$Tusi^* = Tdua(L)/Tmae(L) \quad (3)$$

Thus, when Equation (1) and Equation (2) are substituted for Equation (3), the transmittance Tusi* of the rear panel RP is represented by an equation of $$Tusi^*=((L^{\wedge}2.2/255^{\wedge}2.2)\times(DTmax-DTmin)+DTmin)/((L^{\wedge}2.2/255^{\wedge}2.2)\times(Tmax-Tmin)+Tmin) \quad (4).$$

At this time, DTmin is sufficiently small for DTmax, and thus DTmin is negligible when L is large. For this reason, the transmittance Tusi* of the rear panel RP is rewritten as an equation of $$Tusi^*=((L^{\wedge}2.2/255^{\wedge}2.2)\times DTmax)/((L^{\wedge}2.2/255^{\wedge}2.2)\times(Tmax-Tmin+(255^{\wedge}2.2/L^{\wedge}2.2)\times Tmin))=Dtmax/(Tmax+((255^{\wedge}2.2/L^{\wedge}2.2)-1)\times Tmin) \quad (5).$$

Here, if a contrast of the front panel FP is set to 1000:1 in the first embodiment, an equation of $$Tmin=Tmax/1000 \quad (6)$$

is established.

For this reason, when Equation (6) mentioned above is substituted for Equation (5) mentioned above, an equation of $$Tusi^*=Dtmax/(Tmax\times(1+((255^{\wedge}2.2/L^{\wedge}2.2)-1)/1000))=(Dtmax/Tmax)\times(1000/(1000-1+(255^{\wedge}2.2/L^{\wedge}2.2))) \quad (7)$$

is obtained.

Here, a case where DTmax is set is a case where 255 which is maximum gray scale data is input to the front panel FP, and 255 which is maximum gray scale data is also input to the rear panel RP, and thus an equation of $$DTmax=Tmae(255)\times Tusi(255) \quad (8)$$

is established.

In addition, since the maximum gray scale data is 255, an equation of $$Tmax = Tmae(255) \qquad (9)$$

is established.

For this reason, when Equation (8) and Equation (9) are substituted into Equation (7), an equation of $$Tusi^* = Tusi(255) \times \xi(L) \qquad (10)$$

is obtained.

Here, the function $\xi(L)$ is a function of the input display gray scale data L and is represented by $$\xi(L) = 1000/(999 + (255^{2.2}/L^{2.2})) \qquad (11).$$

Figure 6:
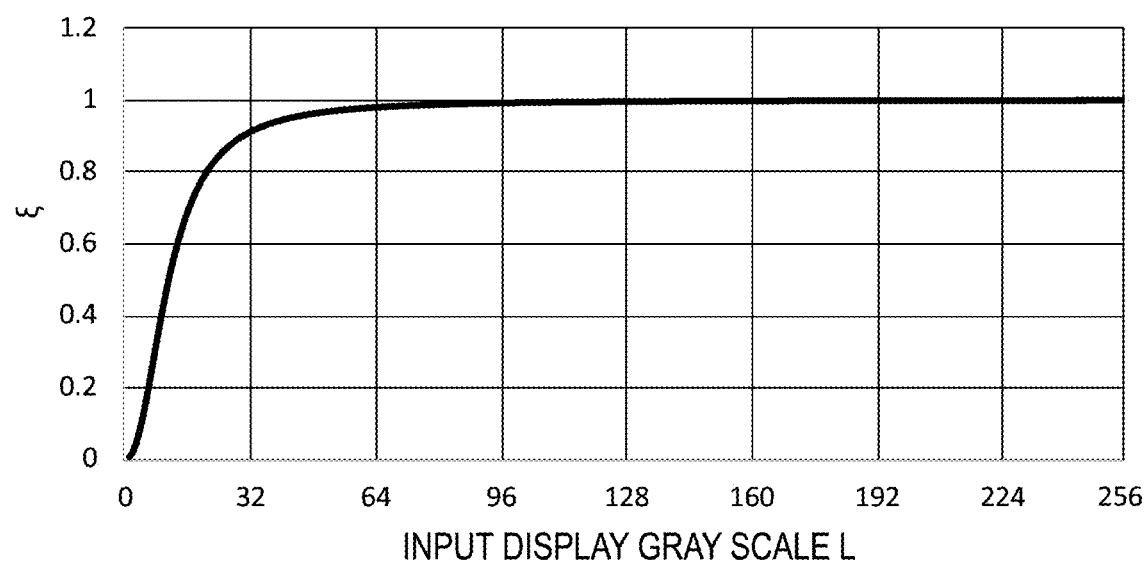
FIG. 6 is a graph of a function ξ indicating a relationship between an input display gray scale and a value obtained by dividing a transmittance for the input display gray scale by a value of a maximum transmittance of the rear panel in a case where a contrast CR of the front panel according to the first embodiment is 1:1000.

FIG. 6 shows the above-described formula of the function $\xi(L)$ and is a graph showing the function $\xi(L)$ in a case where the contrast CR in the first embodiment is 1000:1. Thus, $\xi(L)$ is a function of L in a case where the function is normalized such that a maximum transmittance of Tusi*, that is, T(255) is set to 1.0.

As shown in FIG. 6, when the display gray scale in the drawing is equal to or greater than 64 gray scale, the value of $\xi(L)$ is approximately 1. That is, in an input of L in a range where the value of $\xi(L)$ is approximately 1, an equation of $$Tusi^* = Tusi(255) \times \xi(L) \approx Tusi(255) \qquad (12)$$

is established. This means that panel input gray scale data for the pixel PR of the rear panel RP is only required to be a maximum value of 255 gray scale in a case where L is equal to or greater than 64 gray scale.

Thus, in the first embodiment in which a panel having a contrast of 1000:1 is used, a 64 gray scale is an output determination reference gray scale level. Note that the display gray scale in FIG. 6 is equivalent to input display gray scale data of the input image signal Sin in the first embodiment.

More specifically, the rear panel data conversion circuit RPC in the first embodiment converts extracted gray scale data into gray scale data of a maximum gray scale value as panel input gray scale data which is input to the pixel PR of the rear panel RP in a case where the extracted gray scale data has a level equal to or higher than the output determination reference gray scale level.

The value of the above-described output determination reference gray scale level greatly depends on the contrast of the front panel FP. For example, in a case where the contrast of the front panel FP is 1000:1, the output determination reference gray scale level is 64 gray scale, while in a case where the contrast of the front panel FP is 100:1, the output determination reference gray scale level is approximately 210 gray scale. Thus, it is desirable that the value of the output determination reference gray scale level is adjusted by the contrast of the two panels used in the liquid crystal display device LCD.

As described above, in the liquid crystal display device LCD according to the first embodiment, in a case where the value of the extracted gray scale data has a level equal to or higher than the output determination reference gray scale level, panel input gray scale data for the pixel PR of the rear panel RP is gray scale data (255 in the case of 8 bits) in which the transmittance of the pixel PR of the rear panel RP is maximum.

On the other hand, the extracted gray scale data may be lower than the output determination reference gray scale level. In the liquid crystal display device LCD according to the first embodiment, input gray scale data for the pixel PR of the rear panel RP corresponding to each piece of extracted gray scale data lower than the output determination reference gray scale level is calculated in advance.

In the present specification, the gray scale data calculated in advance is referred to as selected gray scale data. Regarding the selected gray scale data, each of the pieces of selected gray scale data for each piece of extracted gray scale data less than the output determination reference gray scale level is stored in the control unit C in the format of a look-up table (LUT).

In a case where extracted gray scale data of a certain pixel PR of the rear panel RP is less than the output determination reference gray scale level, a specific method of determining panel input gray scale data M which is input to the pixel PR of the rear panel RP will be described. The panel input gray scale data M is the above-described selected gray scale data. Here, for ease of description, regarding a method of calculating panel input gray scale data input to each panel, the description of a calculation method in a case where the same input display gray scale data value is input to display pixels including subpixels will be continued.

When the panel input gray scale data input to the pixel PR of the rear panel RP is assumed to be M in a case where a γ-characteristic of the rear panel RP is γ=2.2, a transmittance Tusi(M) of the pixel PR of the rear panel RP is represented by an equation of $$Tusi(M) = (M^{2.2}/255^{2.2}) \times (Tusi(255) - Tusi(0)) + Tusi(0) \qquad (13).$$

The transmittance Tusi* of the rear panel is Tusi*=Tusi(M). Thus, panel input gray scale data M corresponding to the transmittance of Tusi* can be calculated by an equation of $$M = ((Tusi^* - Tusi(0))/(Tusi(255) - Tusi(0)) \times 255^{2.2})^{(1/2.2)} \qquad (14).$$

Regarding the transmittance Tusi* of the pixel PR of the rear panel RP, an equation of $$Tusi^* = Tdua(L)/Tmae(L) \quad (0 \le L \le 63) \qquad (15)$$

is established also in a case where the display gray scale data L is less than 64 gray scale.

When Equation (15) is substituted for Equation (14) for calculating M, an equation of $$M = (((Tdua(L)/Tmae(L)) - Tusi(0))/(Tusi(255) - Tusi(0)) \times 255^{2.2})^{(1/2.2)} \qquad (16)$$

is derived. The panel input gray scale data M input to the rear panel RP for the input display gray scale data L is calculated by Equation (16).

Thus, in the first embodiment, even when the input display gray scale data L is equal to or less than the output determination reference gray scale level, it can be understood that the panel input gray scale data M input to the pixel PR of the rear panel RP can be easily determined with respect to the input display gray scale data L. That is, even when extracted gray scale data extracted from input display gray scale data of a video input signal corresponding to the pixel PR of the rear panel RP is less than the output determination reference gray scale level, the panel input gray scale data M input to the pixel PR of the rear panel RP can be easily calculated.

In this manner, the panel input gray scale data M input to the pixel PR of the rear panel RP is easily calculated by Equation (16). The panel input gray scale data M input to the pixel PR of the rear panel RP is the selected gray scale data described above.

In the first embodiment, selected gray scale data (panel input gray scale data M) calculated on the basis of extracted gray scale data for an input display gray scale equal to or less than an output determination reference level is stored in the control unit C in the format of a look-up table (LUT) with a one-to-one relationship for the extracted gray scale data. Thus, the control unit C can immediately determine selected gray scale data (panel input gray scale data M), which is input gray scale data input to the pixel PR of the rear panel RP, without performing a complex operation after determining the extracted gray scale data.

However, in a case where the output determination reference gray scale level is determined, it is preferable that gray scale characteristics of a transmittance when two panels are superimposed on each other not be discontinuous before and after the output determination reference gray scale. When viewing the graphs that show a relationship between an input display gray scale and a transmittance (see FIG. 4 and FIG. 5), at an output determination reference gray scale (64 gray scale in the first embodiment), there is a difference between the transmittance in the graph having a characteristic of $\gamma=2.2$ and the transmittance when the input of the rear panel is fixed to 255 gray scale.

For this reason, when selected gray scale data is determined using the graph having a characteristic of $\gamma=2.2$ in a case where the extracted gray scale data has a level equal to or less than the output determination reference gray scale level, a gray scale characteristic of a transmittance when two panels are superimposed on each other is discontinuous before and after the output determination reference gray scale level. Thus, in a relationship between the output determination reference gray scale level and input display gray scale before and after the output determination reference gray scale level, it is preferable to determine the output determination reference gray scale level so that a difference in the transmittance in the graph having a characteristic of $\gamma=2.2$ be equal to or less than a difference in transmittance which is equivalent to 0.5 gray scale. Further, it is preferable to perform adjustment such that a difference between a transmittance corresponding to the output determination reference gray scale level and a transmittance of two panels which corresponds to gray scale data one level before the output determination reference gray scale level or gray scale data one level after the output determination reference gray scale level is converted into a gray scale and is set to be, for example, less than 1.5 gray scale.

The calculation of panel input gray scale data which is input to each subpixel of the front panel FP will be described on the basis of the content of the method of calculating the panel input gray scale data for the pixel PR of the rear panel RP. As described above, the panel input gray scale data which is input to the pixel PR of the rear panel RP is derived by setting a maximum amount of subpixel gray scale data to be extracted gray scale data among a set of pieces of subpixel gray scale data corresponding to input display pixels in the virtual opposing region and using the extracted gray scale data. However, the subpixels of the input display pixels included in the virtual opposing region are subpixel gray scale data having a value smaller than the value of the extracted gray scale data. Thus, subpixels of the front panel FP corresponding to the subpixels which are input display subpixel gray scale data having a value smaller than the value of the extracted gray scale data emit light having a luminance that is far from the luminance of a desired color in a case where the corresponding input display subpixel gray scale data is input with the same value.

Regarding this, there are cases of the following conditions, and necessary measures for panel input gray scale data which is input to the subpixels of the front panel FP for each condition will be described.

A case where panel input gray scale data is input to the rear panel RP is calculated in the following cases (A) and (B).

(A) A case where extracted gray scale data corresponding to the pixel PR of the rear panel RP is determined to be equal to or higher than an output determination reference gray scale level (B) A case where extracted gray scale data corresponding to the pixel PR of the rear panel RP is determined to be less than an output determination reference gray scale level Next, panel input gray scale data which is input to subpixels of the front panel FP in a virtual opposing region facing the pixel PR of the rear panel RP is calculated in the following cases shown in (i) to (iii).

(i) A case where all pieces of input display subpixel gray scale data corresponding to all subpixels in the virtual opposing region are equal to or higher than the output determination reference gray scale level (ii) A case where all pieces of input display subpixel gray scale data corresponding to all subpixels in the virtual opposing region are lower than the output determination reference gray scale level (iii) A case where the input display subpixel gray scale data corresponding to the subpixels in the virtual opposing region is equal to or higher than and is also less than the output determination reference level First, a case corresponding to both (A) and (i) is considered.

In this case, input display subpixel gray scale data equal to or higher than the output determination reference gray scale level is input to each of the plurality of subpixels of the front panel FP. In this case, a maximum amount of subpixel gray scale data is only required to be input to the pixel PR of the rear panel RP for all subpixels in the virtual opposing region, that is, a $\gamma$-characteristic may be set to $\gamma=2.2$ for all subpixels in the virtual opposing region. For this reason, it is not necessary to convert the gray scale data input to the subpixels from the value of the input display gray scale data. That is, for the panel input gray scale data of the subpixels, the value of the input display subpixel gray scale data is optimally input to the subpixels without being converted as is.

A case corresponding to both (B) and (i) is conceivable.

The case of (B) is a case where all pieces of input display subpixel gray scale data corresponding to the subpixels of the front panel in the virtual opposing area facing the pixel PR of the rear panel RP are lower than the output determination gray scale level, and a case corresponding to both (B) and (ii) does not need to be considered because such a case cannot actually occur.

A case corresponding to both (A) and (ii) is considered.

Similarly, a case corresponding to both (A) and (ii) does not need to be considered because such a case cannot actually occur.

A case corresponding to both (B) and (ii) is considered.

In this case, selected gray scale data which is calculated in advance is input to the pixel PR of the rear panel RP for which it is determined that the extracted gray scale data has a level lower than the output determination reference gray scale level. In a case where input display subpixel gray scale data of the extracted gray scale data is input to the subpixels of the front panel FP, the selected gray scale data becomes calculated gray scale data so that a transmittance of two panels is set to be a transmittance corresponding to the gray scale data. Thus, in a case where the input display subpixel gray scale data is the same as the extracted gray scale data, it is not necessary to convert the input display subpixel gray scale data as panel input gray scale data for the subpixels of the front panel FP.

In a case where the input display subpixel gray scale data is smaller than the extracted gray scale data, an output of the subpixel has a value which is markedly different from the γ-characteristic. However, since there are subpixels for outputting extracted gray scale data in the same area, human visual characteristics attempt to match the sensitivity thereof to subpixels having a higher luminance around subpixels having a low luminance. For this reason, the quality of display is not impaired due to a difference between the value of luminance of the subpixels having a low luminance and the value of luminance of the γ-characteristic.

Thus, also in this case, the panel input gray scale data which is input to the subpixels of the front panel FP does not need to be converted from the input display subpixel gray scale data.

A case corresponding to both (A) and (iii) is considered.

In the case of subpixels serving as input display subpixel gray scale data equal to or greater than extracted gray scale data among the subpixels of the input display pixels in the virtual opposing region facing the pixels PR of the rear panel RP, when the input display subpixel gray scale data is input thereto, an output in which the γ-characteristic is retained is obtained. On the other hand, in the case of subpixels in which input display subpixel gray scale data is smaller than the output determination reference gray scale, the γ-characteristic is not retained. However, due to human visual characteristics, even in this case, panel input gray scale data which is input to the subpixels of the front panel FP does not need to be converted from the input display subpixel gray scale data. The reason for this is that, since there is a subpixel for outputting a luminance equal to or greater than the output determination reference gray scale in the same virtual opposing region, human visual characteristics attempt to match the sensitivity thereof to subpixels having a higher luminance around subpixels having a low luminance. For this reason, even in the case of input display gray scale data smaller than the output determination reference gray scale, the quality of display is not impaired due to a difference between the value of luminance of the subpixels having a low luminance and the value of luminance of the γ-characteristic. Thus, also in this case, the panel input gray scale data which is input to the subpixels of the front panel FP does not need to be converted from the input display subpixel gray scale data.

A case corresponding to both (B) and (iii) is considered.

This case does not also need to be considered because such a case cannot actually occur.

As described above, in each of the case corresponding to both (A) and (i), the case corresponding to both (A) and (ii), the case corresponding to both (A) and (iii), the case corresponding to both (B) and (i), the case corresponding to both (B) and (ii), and the case corresponding to both (B) and (iii), the value of input display gray scale data is only required to be input as input gray scale data for the subpixels of the front panel FP.

In this manner, even in a case where the subpixels of the front panel FP extend over a plurality of virtual opposing regions, input display subpixel gray scale data corresponding to the subpixels can be input as is.

Figure 7:
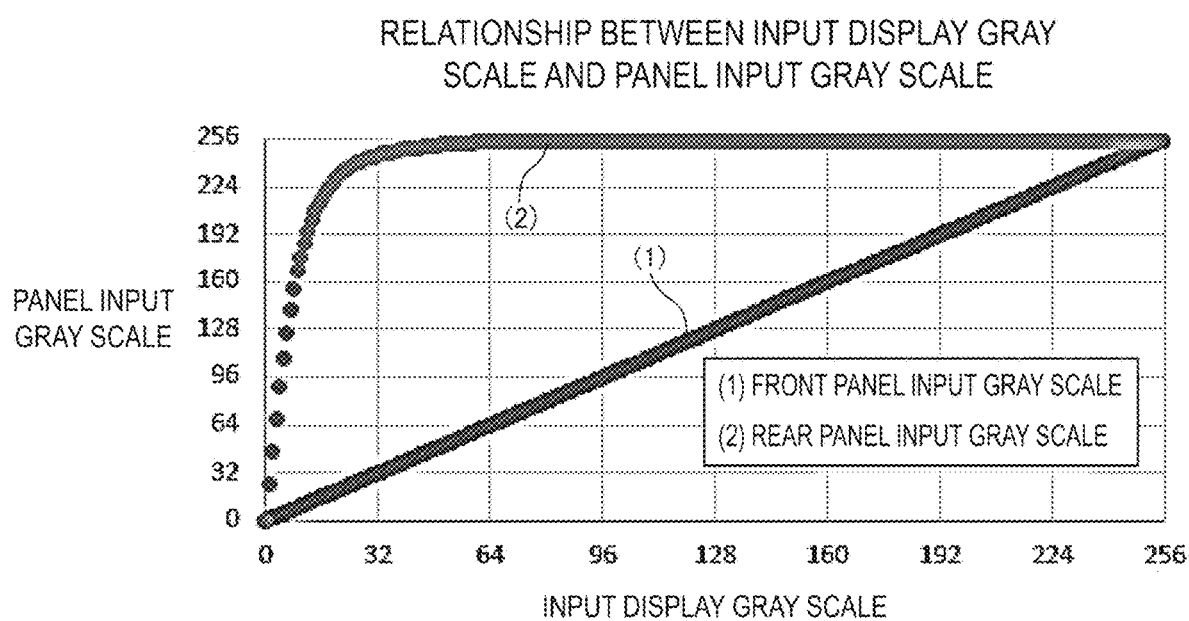
FIG. 7 is a graph showing a relationship between an input display gray scale and a panel input gray scale which is input to each of the front and rear panels in an example of the first embodiment of the disclosure.

FIG. 7 shows a relationship between an input display gray scale of a display pixel displayed on the display screen SC by the two panels according to the first embodiment and a panel input gray scale which is input to each of the front panel FP and the rear panel RP.

The input display gray scale in the horizontal axis in the graph shown in FIG. 7 indicates the value of input display gray scale data of an input image signal in the case of a graph showing a panel input gray scale for the pixel PF of the front panel FP in (1). As described above, for the front panel FP, the values of panel input gray scale data are identical to those of the input display gray scale data.

An input display gray scale in the horizontal axis in the case of a graph showing a panel input gray scale for the pixel PR of the rear panel RP in (2) in FIG. 7 indicates the value of extracted gray scale data extracted from input display subpixel gray scale data in a virtual opposing region facing one pixel PR of the rear panel RP. As shown in FIG. 7, regarding the characteristics of (2), when the input display gray scale increases from 0 gray scale to 64 gray scale, the panel input gray scale for the pixel PR also increases. On the other hand, when the input display gray scale exceeds 64 gray scale, the panel input gray scale for the pixel PR is maintained at a fixed value even when the input display gray scale increases.

Note that, in the graph in FIG. 7, it is assumed that both the front panel FP and the rear panel RP have a characteristic of γ=2.2 for a relationship between panel input gray scale data input to each panel and each transmittance.

By executing the above-described control by the control unit C, panel input gray scale data which is respectively input to each of the pixels PF of the front panel FP and each of the pixels PR of the rear panel RP is determined to correspond to input display gray scale data of an input image signal Sin with a one-to-one relationship.

For this reason, it is possible to significantly reduce the size of an electronic circuit for determining the panel input gray scale data and to make the control unit C have a realizable electronic circuit size.

The above can be summarized as follows.

The liquid crystal display device LCD according to the first embodiment includes the rear panel RP which is an example of a first liquid crystal panel including the plurality of pixels PR of the rear panel RP as a plurality of first pixels. The liquid crystal display device LCD includes the front panel FP which is an example of a second liquid crystal panel. The liquid crystal display device LCD includes the control unit C that controls the rear panel RP and the front panel FP.

The front panel FP is provided to overlap the rear panel RP. The front panel FP includes the plurality of pixels PF (second pixels). The plurality of pixels PF have the same size. Further, the plurality of pixels PR (first pixels) also have the same size. The size of the pixel PF is different from the size of the pixel PR. Each of the plurality of pixels PF includes a set of subpixels (R, G, and B).

The front panel FP includes a plurality of virtual opposing regions (regions surrounded by the dashed line in FIG. 3) that face the plurality of pixels PR with a one-to-one relationship. Each of the plurality of virtual opposing regions includes two or more subpixels or includes one or more subpixels and a predetermined number of subpixel partial structures which are a portion of a predetermined number of subpixels (see (1) to (16) in the region surrounded by the dashed line in FIG. 3). Here, each of the two or more subpixels or each of the one or more subpixels refers to the overall structure of one subpixel, and the subpixel partial structure is a partial structure having only a portion of the overall structure of one subpixel.

The control unit C receives an input image signal including input display gray scale data corresponding to the virtual opposing region for each of the plurality of virtual opposing regions. The control unit C selects a set of pieces of subpixel gray scale data corresponding to the virtual opposing region from the input display gray scale data. The control unit C extracts the largest subpixel gray scale data among the set of pieces of subpixel gray scale data as extracted gray scale data corresponding to one pixel PR (first pixel) facing the virtual opposing region. The control unit C sets gray scale data having the largest transmittance of the first liquid crystal panel to be a designated pixel, and controls the transmittance of light of one pixel PR (first pixel) using designated pixel gray scale data when the extracted gray scale data has a level equal to or higher than an output determination reference gray scale level.

As described above, in the first embodiment, the circuit of the control unit C can be realized by an application specific integrated circuit (ASIC) or a field-programmable gate array (FPGA) having a relatively small number of logic gates and a memory capacity.

Note that, in a case where the extracted gray scale data has a level lower than the output determination reference gray scale level, the control unit C stores each piece of previously calculated selected gray scale data corresponding to each of the plurality of pieces of extracted gray scale data, selects one piece of corresponding selected gray scale data in accordance with the extracted gray scale data from among the above-described pieces of selected gray scale data, and controls the transmittance of light of the above-described one pixel PR (first pixel) of the rear panel RP using the one piece of corresponding selected gray scale data.

Figure 8:
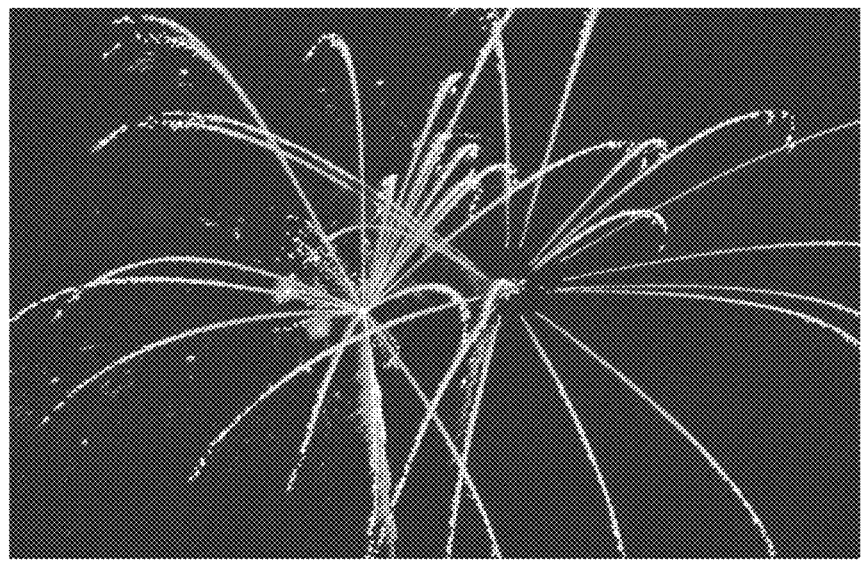
FIG. 8 is a diagram illustrating an example of display on a display screen of a liquid crystal display device constituted by one liquid crystal panel according to a comparative example, the display being theoretically considered to look like that illustrated in the diagram through simulation taking human visual characteristics into account.
Figure 9:
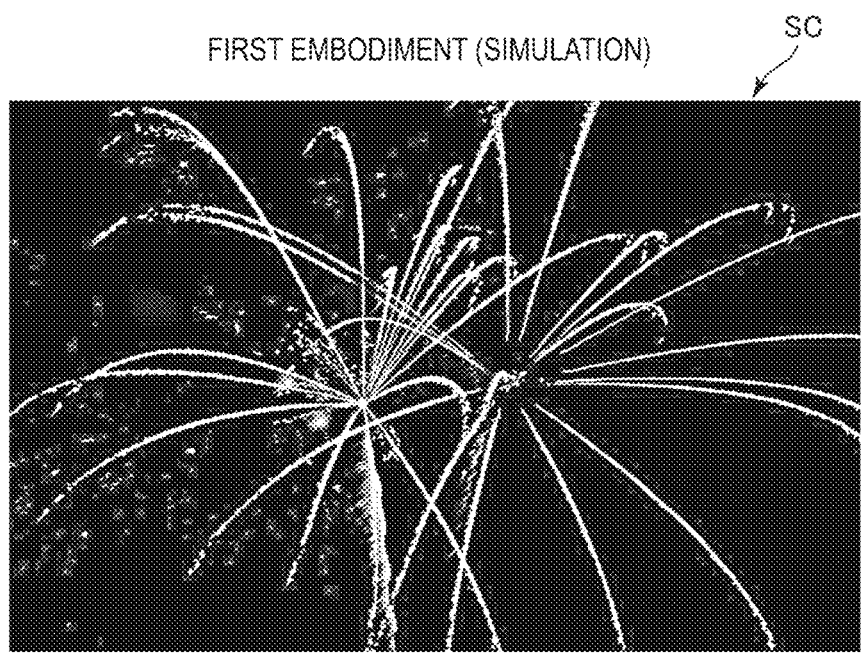
FIG. 9 is a diagram illustrating an example of display on a display screen of the liquid crystal display device constituted by two liquid crystal panels, that is, the front panel and the rear panel according to the first embodiment, the display being theoretically considered to look like that illustrated in the diagram through simulation taking human visual characteristics into account.

FIG. 8 is a diagram illustrating an example of image data displayed on a liquid crystal display device constituted by one liquid crystal panel as a comparative example of the first embodiment. Thus, FIG. 8 illustrates an example of display on a liquid crystal display device in the related art. On the other hand, FIG. 9 is a diagram illustrating a display example when the same image data is displayed on the liquid crystal display device LCD according to the first embodiment, the liquid crystal display device LCD being constituted by two liquid crystal panels. Each of FIGS. 8 and 9 illustrates an image in which display on the liquid crystal display device configured as described above is simulated as an image perceived by a person.

According to the comparison between FIG. 8 and FIG. 9, FIG. 9 illustrates a much darker black display than FIG. 8. That is, in the liquid crystal display device LCD according to the first embodiment which is constituted by two panels, namely, the rear panel RP and the front panel FP, it can be understood that contrast is markedly improved, as compared with a liquid crystal display device constituted by one liquid crystal panel in the related art. Thus, even when the environment around the liquid crystal display device LCD according to the first embodiment is dark, black display does not appear white, and an image is easily viewed.

As described above, in the first embodiment, it is possible to provide a liquid crystal display device LCD having a high contrast with a realizable circuit size.

Note that, in the present embodiment, the above-described control performed by the control unit C is executed by the electronic circuit provided in the control unit C, but the above-described control performed by the control unit C may be executed by software using a processing device such as a central processing unit (CPU).

Second Embodiment

Next, a liquid crystal display device according to a second embodiment will be described. Note that description of points similar to those in the first embodiment will not be repeated below.

Figure 10:
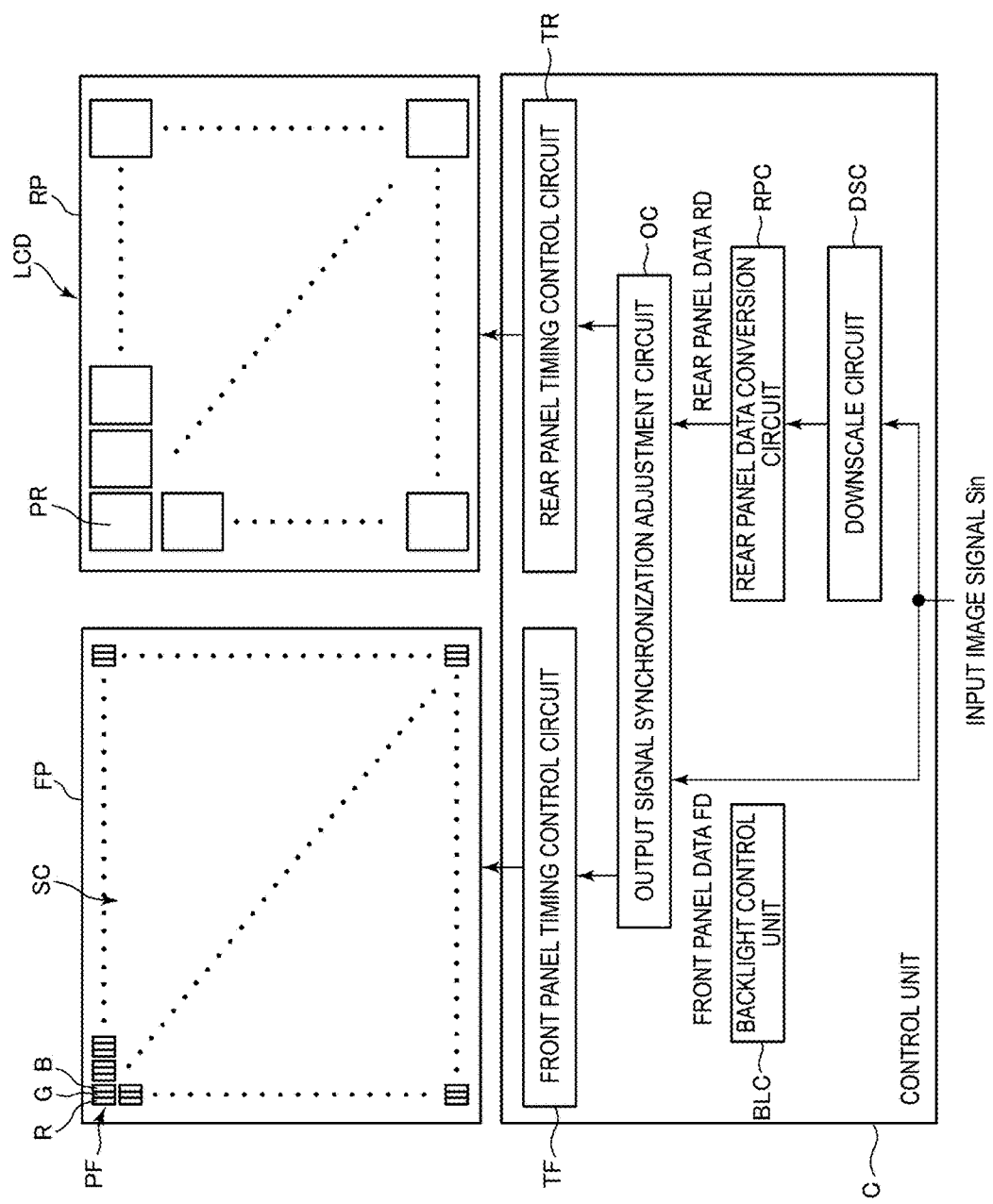
FIG. 10 is a schematic plan view illustrating configurations of a front panel, a rear panel, and a control unit of a liquid crystal display device according to a second embodiment.

A liquid crystal display device LCD according to the second embodiment differs from the liquid crystal display device LCD according to the first embodiment in that a downscale circuit DSC is provided as illustrated in FIG. 10. In other respects, the liquid crystal display device LCD according to the second embodiment and the liquid crystal display device LCD according to the first embodiment are the same.

More specifically, the liquid crystal display device LCD according to the second embodiment differs from the liquid crystal display device LCD according to the first embodiment in that a downscale input image signal which is output by the downscale circuit DSC is input to a rear panel data conversion circuit RPC as illustrated in FIG. 10. In addition, an input image signal Sin is input to the downscale circuit DSC.

The downscale circuit DSC in the second embodiment converts the input image signal Sin into a downscaled image signal so as to reduce the number of pieces of input display gray scale data included in the input image signal Sin. For the following description, the number of pieces of input display gray scale data corresponding to the number (resolution) of pixels of the downscaled image signal is assumed to be a horizontal number×a vertical number=I(H)×J(V).

In the second embodiment, the downscale circuit DSC performs resolution conversion so that a display pixel number of the input image signal Sin becomes a value that is proportional to a panel pixel number of a rear panel RP. That is, when n is assumed to be a certain natural number and a panel pixel number of the rear panel is assumed to be Hdisp(H)×Vdisp(V), the downscale circuit DSC performs resolution conversion of the input image signal Sin so that a virtual display pixel number I(H)×J(V) of the downscaled image signal is set to be $I = H\text{disp} \times n$ $J = V\text{disp} \times n.$ For example, a case where the display pixel number of the input image signal Sin is 1920(H)×1080(V), a panel pixel number of the rear panel RP is 576(H)×324(V), and n=2 described above is considered. In this case, the input image signal Sin is converted into a downscaled image signal of a virtual display pixel number of I=1152 and J=648 (that is, 1152(H)×648(V)) by the downscale circuit DSC.

In this manner, the downscaled image signal is converted into an image signal having a number of pixels that is an integer multiple of the panel pixel number of the rear panel RP.

In addition, the downscaled image signal does not include data of subpixels. The downscale circuit DSC performs resolution conversion from one group of input display subpixel gray scale data included in one piece of input display gray scale data of the input display pixel included in the input image signal Sin into one piece of gray scale data. In this case, the one piece of display gray scale data is the value of gray scale data having a maximum luminance in the one group of input display subpixel gray scale data, or the value of gray scale data which is an average value of luminances of subpixels of one group.

Further, in the resolution conversion of the downscale circuit DSC, input display gray scale data of one display pixel included in the downscaled image signal is set to be a maximum value, an average value, or a median value of input display gray scale data of a plurality of display pixels included in the input image signal Sin corresponding to the pixel.

The value of n described above is a value determined in advance as a downscale constant of the downscale circuit DSC. In addition, the value of n is a small value of approximately 1, 2, or 3, and is not a very large value.

As described above, in a case where the downscale constant is set to be n, a display pixel at the position of (i, j) of the downscale-converted downscaled image signal corresponds to a display pixel at the position of (i/n, j/n) of the rear panel RP. Here, values after the decimal points of i/n and j/n are truncated.

Thus, one display pixel of the downscaled image signal corresponds to a panel pixel PR of one rear panel RP. For this reason, it is possible to reduce a buffer memory of a processing circuit for extracting extracted gray scale data from some pieces of input display gray scale data of display pixels included in a downscaled image signal located in a virtual opposing region facing one pixel PR of the rear panel RP. As a result, the architecture of the control unit C can be simplified.

In the control unit C of the liquid crystal display device LCD according to the first embodiment, the input image signal Sin is input to the rear panel data conversion circuit RPC. In this case, a display pixel number of the input image signal Sin is not an integer multiple of a panel pixel number of the rear panel RP in many cases. Accordingly, certain input display subpixel gray scale data of the input image signal is referred to for the extraction of the extracted gray scale data in some pixels PR of the rear panel RP.

In a case where the control unit C uses gray scale data having the highest luminance of a subpixel as the extracted gray scale data as described above, the transmittance of the pixel PR of the rear panel RP is controlled to be a high value. In the first embodiment described above, any one piece of input display subpixel gray scale data in the extraction of the extracted gray scale data may be referred to a plurality of times in many cases. In a case where the input display subpixel gray scale data has a large value, there is a possibility that the input display subpixel gray scale data will be adopted as some pieces of extracted gray scale data of the pixels PR of the rear panel RP. As a result, the control unit C according to the first embodiment may control many pixels PR of the rear panel RP to have a high transmittance.

For example, in the input image signal Sin, a display image in which the background of the display is black, and there are several white squares in the background is considered. In a case where there is a boundary line between the white square and the black background in the display image within a virtual opposing region of one pixel PR of the rear panel RP, extracted gray scale data within the virtual opposing region through which the boundary line passes is white gray scale data, and thus most of the transmittances of the pixels PR of the rear panel RP are controlled to have a high transmittance value. In this manner, in the liquid crystal display device LCD according to the first embodiment, the amount of light in the entire screen may be increased due to the input image signal Sin, and in this case, it is difficult to display an image having a high contrast in detail.

On the other hand, in the liquid crystal display device LCD according to the second embodiment, a downscaled image signal which is downscaled in accordance with the resolution of the rear panel RP is input to the rear panel data conversion circuit RPC. Input display gray scale data of display pixels of the downscaled image signal is a value calculated on the basis of some pieces of input display gray scale data included in the input image signal Sin.

For example, in a case where the calculation value of the input display gray scale data of the display pixel of the downscaled image signal is an average value, a display image in which the background of the display is black, and there are several white squares in the background is considered. In this case, the input display gray scale data of the downscaled display pixel of the boundary line between white and black in the display is gray scale data of gray which is an average value thereof. Thus, when it is assumed that the region of the downscaled display pixel is the same as the virtual opposing region (the region surrounded by the alternating dotted-dashed line in FIG. 3), gray scale data of gray may be extracted as extracted gray scale data of the pixel PR of the rear panel RP. Consequently, it is possible to calculate the transmittance of the pixel PR of the rear panel RP which is more faithful to the input image signal Sin and to display an image having a high contrast in detail.

As described above, in the first and second embodiments, the rear panel data conversion circuit RPC selects selected gray scale data, and the control unit C inputs the selected gray scale data to the pixel PR of the rear panel RP as panel input gray scale data. However, in a case where a transmittance difference between adjacent pixels PR of the rear panel RP is large, a contrast between the adjacent pixels PR may not be able to be adjusted to an appropriate contrast only by controlling the transmittance of subpixels in the front panel FP. In that case, the control unit C calculates panel input gray scale data of a target pixel PR of the rear panel RP by using selected gray scale data of the target pixel PR of the rear panel RP and eight pixels PR around the pixel PR.

Specifically, the control unit C calculates an average value or a median value of nine pieces of selected gray scale data including the target pixel PR of the rear panel RP and the pixels PR around the target pixel, or designated gray scale data as panel input gray scale data of the target pixel PR of the rear panel RP. Consequently, it is possible to reduce a difference in transmittance between adjacent pixels PR of the rear panel RP. For this reason, an adverse effect of the display on the liquid crystal display devices LCD according to the first and second embodiments is less likely to be generated.

Figure 11:
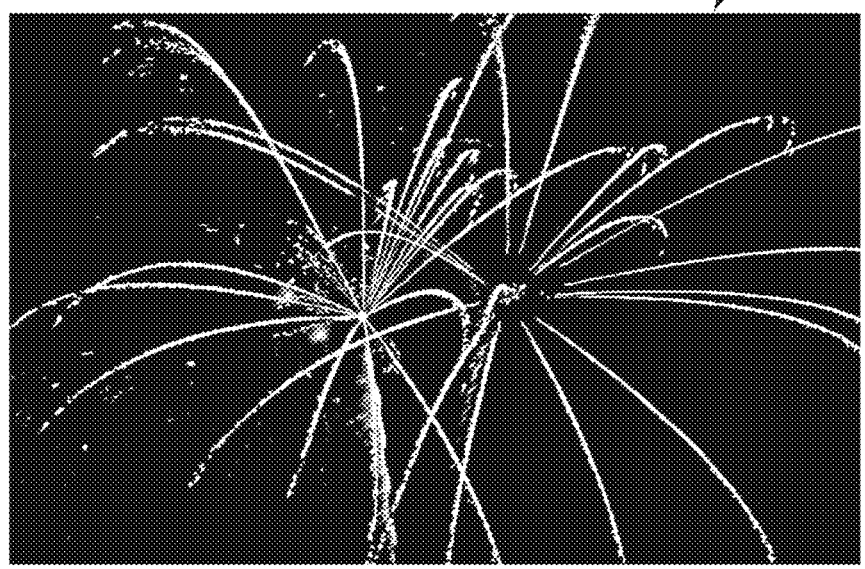
FIG. 11 is a diagram illustrating an example of display on a display screen of the liquid crystal display device according to the second embodiment, the display being theoretically considered to look like that illustrated in the diagram through simulation taking human visual characteristics into account.

FIG. 11 shows the display of the liquid crystal display device LCD according to the second embodiment and illustrates an example of display being theoretically considered to be probably seen in such a manner through simulation taking human visual characteristics into account. Compared with the display on the liquid crystal display device LCD according to the first embodiment in FIG. 9, in the display on the liquid crystal display device LCD according to the second embodiment in FIG. 11, an image of sparks in bright fireworks is not clear, but a black part of the surrounding background of the image of the bright fireworks image is even darker.

As can be understood from the above, the control unit C in the second embodiment receives an input image signal including input display gray scale data of a display pixel number. The control unit C, by using the input display gray scale data of the display pixel number, creates a downscaled image signal including a specific number of pieces of input display gray scale data smaller than a display pixel number, the specific number corresponding to a panel pixel number of the pixels PR (first pixels) within the first liquid crystal panel.

The control unit C extracts extracted gray scale data in a virtual opposing region corresponding to any one pixel PR (first pixel) described above from the input display gray scale data of the display pixel number of the downscaled image signal, in other words, from the specific number of pieces of display gray scale data. The control unit C determines, on the basis of the extracted gray scale data, panel input gray scale data to be input to any one pixel PR (first pixel) to be designated pixel gray scale data or one of the corresponding selected gray scale data. In this manner, in the control unit C in the second embodiment, an input image signal Sin is converted into a downscaled image signal, and thus high-contrast display can be performed on the display screen SC of the liquid crystal display device LCD according to the second embodiment.

Third Embodiment

Next, a liquid crystal display device LCD according to a third embodiment will be described. Note that description of points similar to those in the first or second embodiment will not be repeated below.

Figure 12:
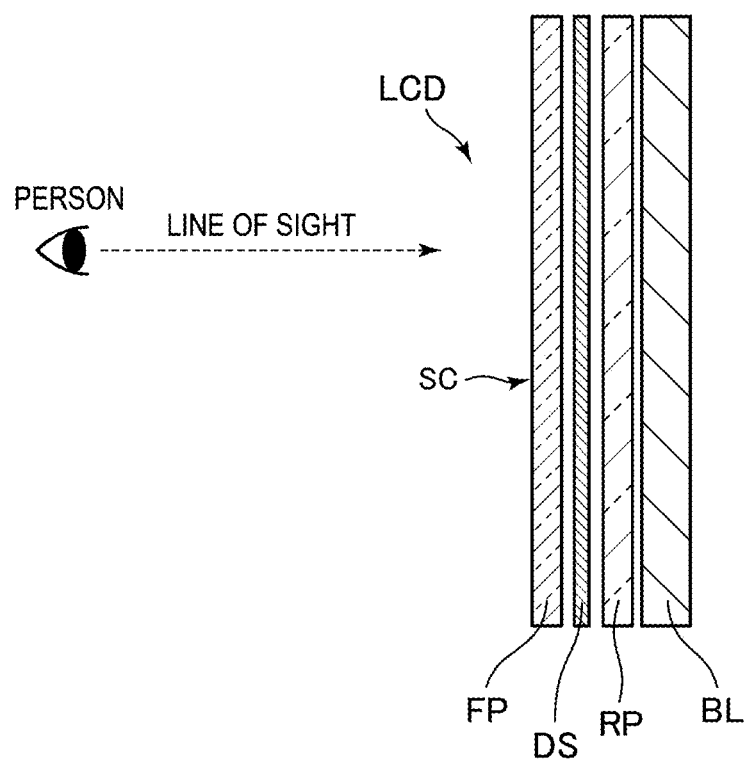
FIG. 12 is a schematic cross-sectional view of the liquid crystal display device according to the second embodiment.

The liquid crystal display device LCD according to the third embodiment differs from the liquid crystal display device according to the first embodiment in that a light diffusion sheet DS is provided between a front panel FP and a rear panel RP, as illustrated in FIG. 12. In other respects, the liquid crystal display device LCD according to the third embodiment and the liquid crystal display device LCD according to the first embodiment are the same. Note that a control unit C in the third embodiment may display an image on a display screen SC by performing control different from the control performed by the control unit C in the first or second embodiment.

In the liquid crystal display device LCD of the disclosure, a pixel PF of the front panel FP and a pixel PR of the rear panel RP have different pixel sizes. The pixels PF of the front panel FP are disposed in a matrix. In addition, the pixels PR of the rear panel RP are also disposed in a matrix.

Figure 13:
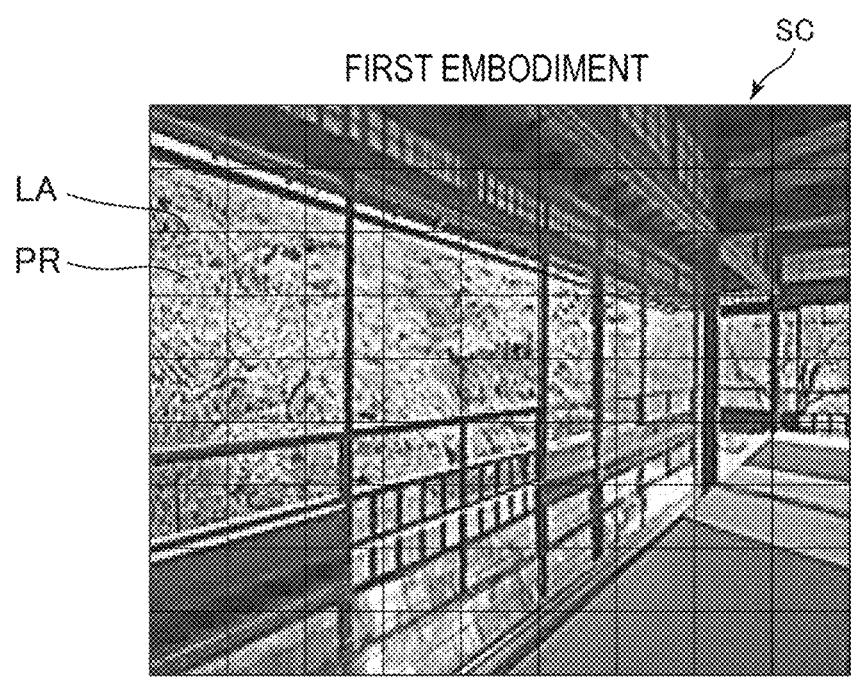
FIG. 13 is a diagram illustrating an example of display on the display screen of the liquid crystal display device according to the first embodiment as a comparative example with respect to a liquid crystal display device according to a third embodiment, the display being theoretically considered to look like that in the diagram through simulation taking human visual characteristics into account.

Each of the pixels PF disposed in a matrix in the front panel FP is provided to have a gap between the pixel PF and a pixel PF adjacent thereto. Each of the pixels PR disposed in a matrix in the rear panel RP is provided to have a gap between the pixel PR and at a pixel PR adjacent thereto. In many cases, the gap between the pixels PF of the front panel FP and the gap between the pixels PR of the rear panel RP do not overlap each other when seen in a plan view. For example, as illustrated in FIG. 13, the gaps between the adjacent pixels PR of the rear panel RP are viewed as a lattice pattern LA.

Figure 14:
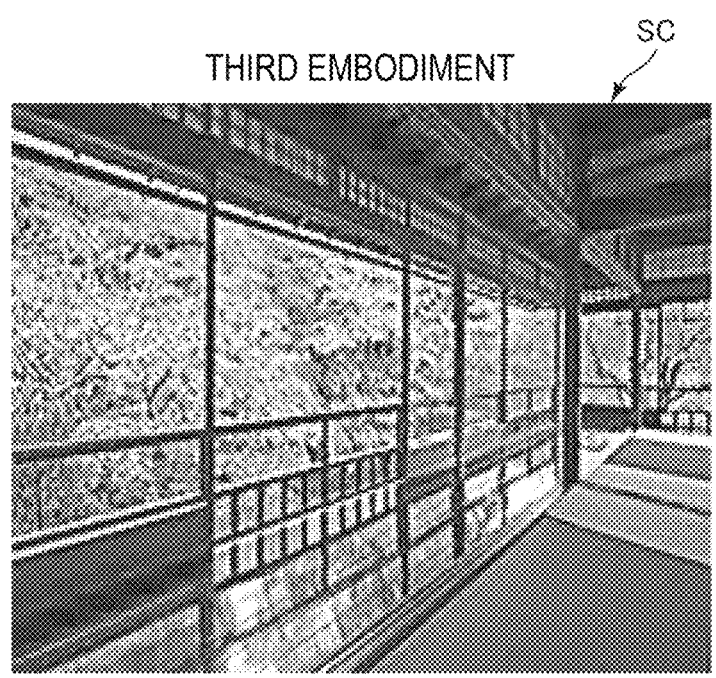
FIG. 14 is a diagram illustrating an example of display on the liquid crystal display device according to the third embodiment, the display being theoretically considered to look like that illustrated in the diagram through simulation taking human visual characteristics into account.

The liquid crystal display device LCD according to the third embodiment includes the light diffusion sheet DS between the front panel FP and the rear panel RP. The light diffusion sheet DS diffuses light traveling from the rear panel RP toward the front panel FP between the front panel FP and the rear panel RP. For this reason, as illustrated in FIG. 14, the black lattice pattern LA described above can be eliminated on the display screen SC. As a result, the quality of an image can be improved.

As can be understood from the above, in the third embodiment, the light diffusion sheet DS inserted between the rear panel RP as a first liquid crystal panel and the front panel FP as a second liquid crystal panel is provided. The light diffusion sheet DS diffuses light between the front panel FP and the rear panel RP. Consequently, it is possible to reduce shading of light caused by a gap between the adjacent pixels PR of the rear panel RP.

Fourth Embodiment

Next, a liquid crystal display device according to a fourth embodiment will be described. Note that description of points similar to those in the first to third embodiments will not be repeated below.

Figure 15:
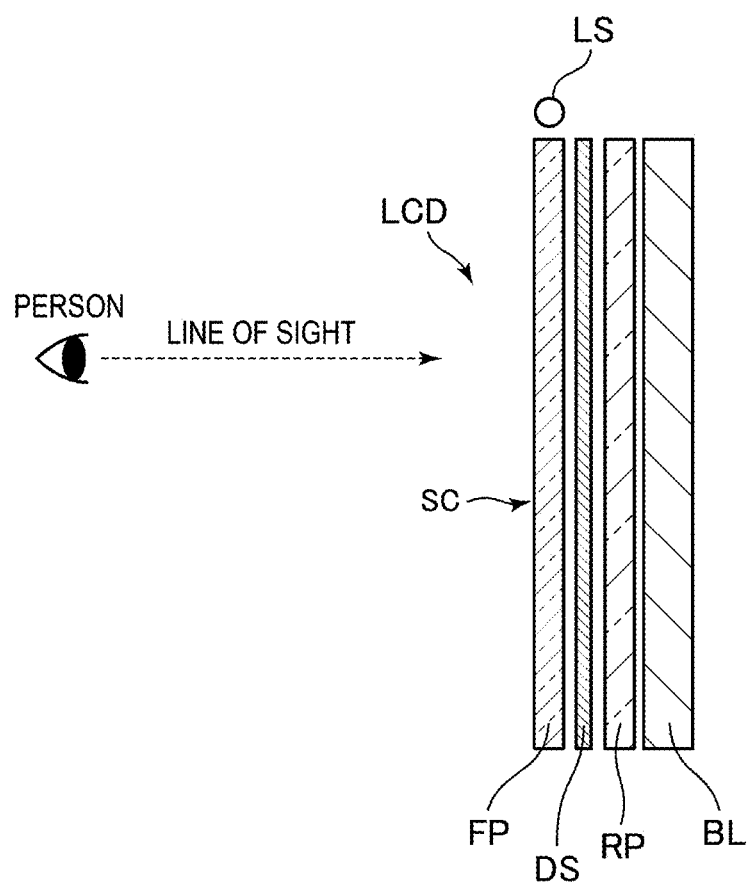
FIG. 15 is a schematic cross-sectional view of a liquid crystal display device according to a fourth embodiment.
Figure 16:
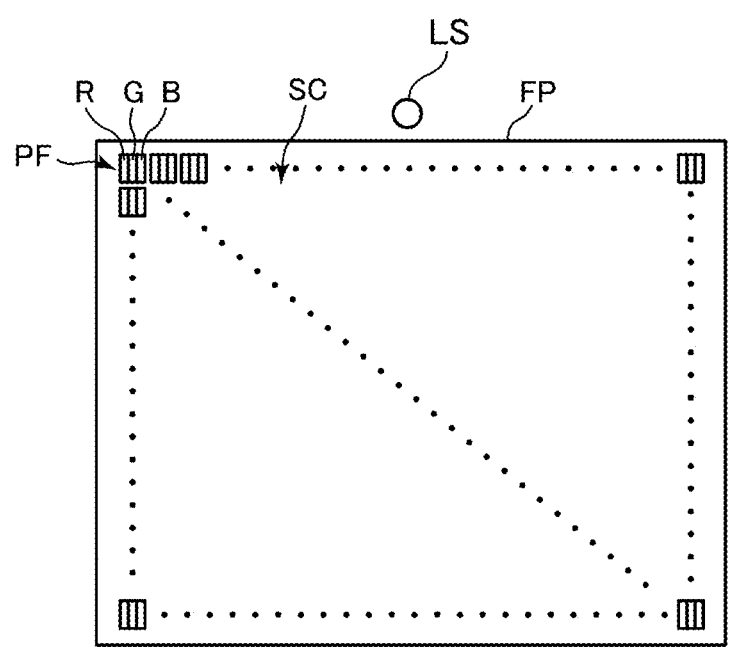
FIG. 16 is a schematic plan view of the liquid crystal display device according to the fourth embodiment.

A liquid crystal display device LCD according to the fourth embodiment differs from the liquid crystal display device LCD according to the first embodiment in that a brightness sensor LS is provided as illustrated in FIGS. 15 and 16. In addition, the liquid crystal display device LCD according to the fourth embodiment differs from the liquid crystal display device LCD according to the first embodiment in that a control unit C performs control so that the brightness of a backlight BL is low in a case where the surrounding environment of a front panel FP and a rear panel RP is dark.

FIGS. 15 and 16 are conceptual diagrams illustrating a structure including a liquid crystal panel constituted by two panels, a backlight BL, a light diffusion sheet DS, and a brightness sensor LS according to the fourth embodiment. FIG. 15 is a side view of the structure, and FIG. 16 is a front view of the structure.

In addition to the above-described points, the liquid crystal display device LCD according to the fourth embodiment and the liquid crystal display device LCD according to the first embodiment are the same. Note that the control unit C in the fourth embodiment may display an image on a display screen SC by performing control different from the control performed by the control unit C in the first or second embodiment.

The control unit C of the liquid crystal display device LCD according to the fourth embodiment controls the rear panel RP as a first liquid crystal panel and the front panel FP as a second liquid crystal panel on the basis of detection results of the brightness sensor LS. The liquid crystal display device LCD according to the fourth embodiment can improve a display contrast by superimposing two panels, namely, the front panel FP and the rear panel RP on each other. However, since a pixel PF of the front panel FP and a pixel PR of the rear panel RP have different sizes, in the case of a display in which a white image is included in a black background, there is an adverse effect that the surroundings of the white image are displayed with a faint white glow.

For example, in a case where a display including one white line having gray scale data of 255 gray scale is performed in a black background having gray scale data of 0 gray scale, the surroundings of the white line may be displayed in a faint white color due to different pixel sizes. The phenomenon in which the surroundings of the white display turn faintly white is referred to as a halo.

Figure 17:
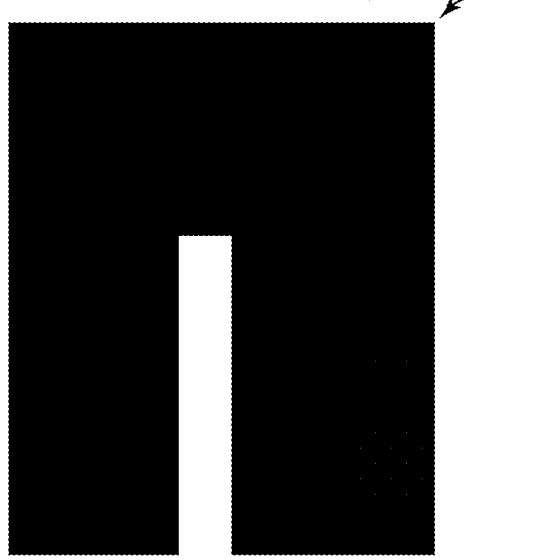
FIG. 17 is a diagram illustrating how display on the display screen of the display screens of the liquid crystal display devices according to the first to third embodiments, which have been placed in a room in which a brightness is 500 lux, is viewed by using an image created through simulation taking human visual characteristics into account.
Figure 18:
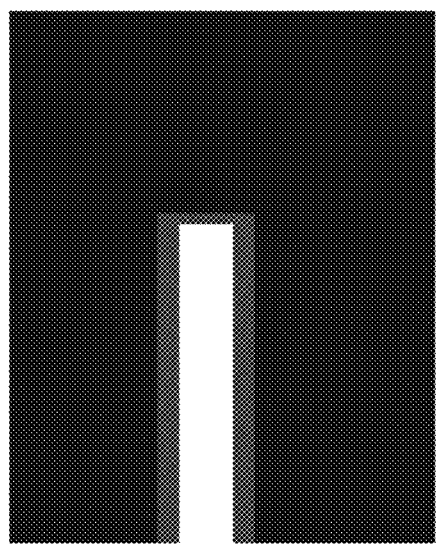
FIG. 18 is a diagram illustrating how display on the display screens of the liquid crystal display devices according to the first to third embodiments, which are placed in a dark room having only 50 lux of brightness, is viewed by using an image created through simulation taking human visual characteristics into account.
Figure 19:
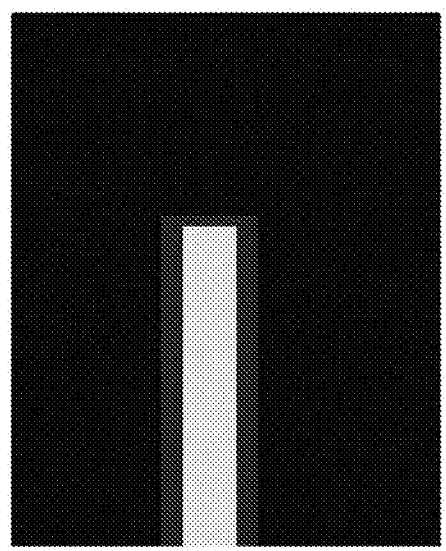
FIG. 19 is a diagram illustrating how display on the display screen of the liquid crystal display device according to the fourth embodiment, which is placed in a dark room having only 50 lux of brightness, is viewed by using an image created through simulation taking human visual characteristics into account.

FIGS. 17 to 19 illustrate images obtained from display simulations of how images including a white line in a black background are viewed under different display luminance conditions and surrounding environments of the liquid crystal display device. Note that the image including the white line in the black background is an image in which it is easy to view a halo, and it becomes easier to view the halo as the surrounding environment becomes darker.

FIGS. 17, 18, and 19 illustrate a case of display on a liquid crystal display device LCD constituted by two panels having different pixel sizes. FIGS. 17, 18, and 19 illustrate how a display is viewed in a case where the brightness of the surrounding environment of the liquid crystal display device LCD varies through simulation taking human visibility into account. Each of FIGS. 17, 18, and 19 is a diagram illustrating how a display is viewed in a case where the contrast of a front panel FP out of the two panels is 1000:1, the maximum luminance of the display is 350 cd/m$^2$, and the display area size is 30 inches. FIG. 17 illustrates a case where the surrounding environment of the liquid crystal display device LCD has a high illuminance of equal to or higher than 100 lux.

As illustrated in FIG. 17, in this case, a halo cannot be viewed. On the other hand, FIG. 18 illustrates a case where the surrounding environment of the liquid crystal display device LCD becomes dark to a degree below 50 lux. Although it depends on the size of the pixel PR of the rear panel RP, when the surrounding environment becomes dark as illustrated in FIG. 18, a halo is viewed.

On the other hand, FIG. 19 illustrates a result of display simulation in a case where the surrounding environment of the liquid crystal display device LCD according to the fourth embodiment is less than 50 lux and a maximum luminance of the liquid crystal display device LCD is reduced to 70%. Comparing FIG. 19 and FIG. 18, it can be understood that it is more difficult to view a halo in FIG. 19.

According to the liquid crystal display device LCD of the fourth embodiment, the control unit C includes a backlight control unit BLC (see FIGS. 2 and 10). In a case where the brightness sensor LS has detected that the brightness of the surrounding environment of the liquid crystal display device LCD has decreased, the backlight control unit BLC reduces the brightness of the backlight BL to a luminance according to the conditions. For example, in a case where the surrounding environment is 50 lux, the luminance is reduced to approximately 70%. In this case, as illustrated in FIG. 19, it is difficult to view a halo.

The phenomenon in which the above-mentioned halo is viewed or is not viewed occurs because the human eye adapts to the brightness of the surrounding environment. In a case where the brightness of the surrounding environment is, for example, 500 lux, the human eye adapts to light having a brightness of approximately 500 lux and views an object or a display. It is said that the human eye can perceive from darkness of 10$^{-6}$ cd/m$^2$ to sunlight of 10$^6$ cd/m$^2$. Thus, the human eye can perceive from darkness to sunlight.

However, the discrimination between light and dark in human vision is based on light-darkness adaptation of the pupil and retina, which change depending on the brightness of the surroundings, as well as the response of photoreceptor cells. The dynamic range of a response of photoreceptor cells other than light-darkness adaptation is only approximately 2 orders of magnitude, that is, on the order of 10$^2$. This means that, for example, when a visual recognition distance is set to 1 m in a case where the surrounding environment including an effect of light emission of a display device is 100 lux, a person can distinguish a difference in brightness only in a range from approximately 1 cd/m$^2$ to 100 cd/m$^2$. That is, the level of luminance at which a person can view a difference in display varies depending on the surrounding environment.

Consequently, a halo black sensitivity value ω is defined as follows.

$$\omega = (LUMA/MCR - LUMA/MCR/UCR)/(SB/100) \quad (17)$$

Here, a contrast value of the front panel FP, a contrast value of the rear panel RP, a maximum luminance value of the liquid crystal display device LCD, and the brightness of the surrounding environment of the liquid crystal display device LCD are assumed to be MCR, UCR, LUMA (cd/m$^2$), and SB (lux), respectively. Note that the contrast value=the maximum transmittance/the minimum transmittance.

Thus, LUMA/MCR represents a black luminance in a case where the front panel FP is in the state of a minimum transmittance and the rear panel RP is in the state of a maximum transmittance. LUMA/MCR/UCR represents a black luminance in a case where none of the front panel FP and the rear panel RP has a minimum transmittance.

In Equation (17) described above for calculating a halo black sensitivity value ω, the difference between LUMA/MCR and LUMA/MCR/UCR is divided by a value equivalent to the sensitivity of black luminance obtained by dividing the brightness SB of the surrounding environment by 10$^2$ which is on the order of the dynamic range of response of human photoreceptor cells. Consequently, the proportion of a difference between black luminance and halo luminance is obtained.

Figure 20:
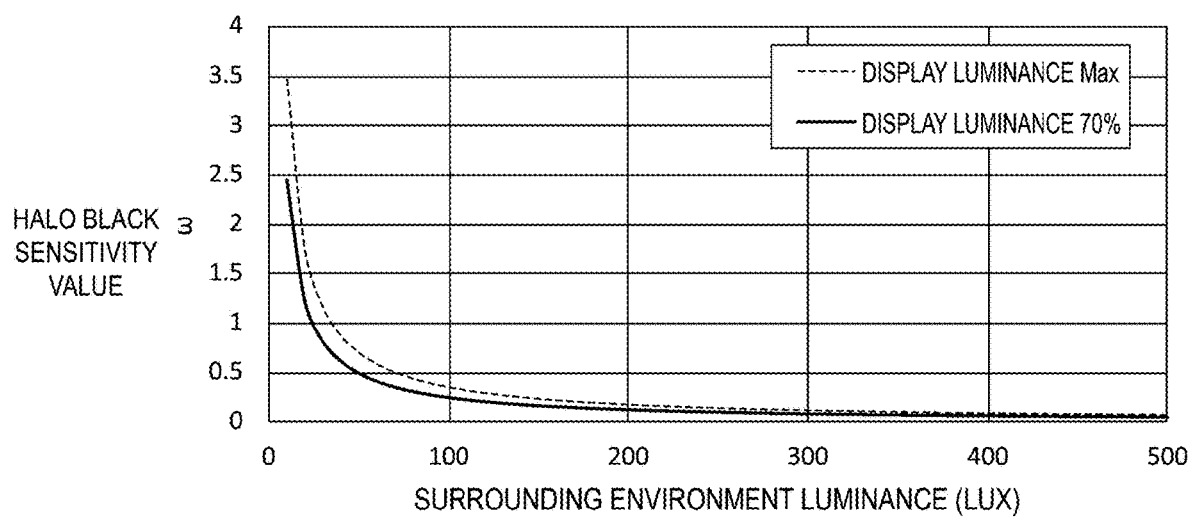
FIG. 20 is a graph showing a relationship between a surrounding environment luminance and a halo black sensitivity value.
Figure 21:
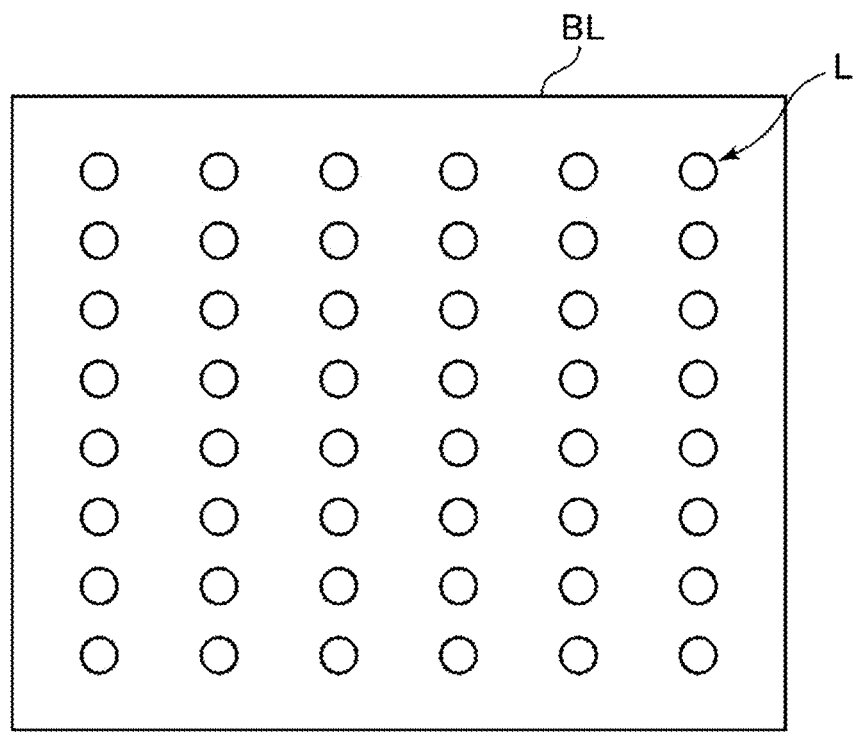
FIG. 21 is a schematic plan view of a backlight of a liquid crystal display device according to a fifth embodiment.

When LUMA=350 cd/m$^2$, MCR=1000, and UCR=1000 are substituted into the formula for the above-described halo black sensitivity value ω, the halo black sensitivity value ω for the brightness of the surrounding environment changes as indicated by a dashed line shown in FIG. 20. On the other hand, in a case where the maximum luminance value of the display screen SC (350 cd/m$^2$) is reduced to 70%, that is, substituting LUMA=350×0.7 cd/m$^2$, a halo black sensitivity value ω for the brightness of the surrounding environment changes as indicated by a solid line shown in FIG. 20.

In FIG. 20, a halo black sensitivity value at the time of a display luminance Max (100%) in which the luminance of the surrounding environment is 50 lux is compared with a halo black sensitivity value ω when the display luminance is 70%. As a result, it can be understood that the halo black sensitivity value ω=0.70 in the case of 350 cd/m$^2$ in which a maximum luminance of the display screen SC is 100%, and the halo black sensitivity value ω=0.49 in the case of 350×0.7 cd/m$^2$ in which a maximum luminance of the display screen SC is 70%.

As illustrated in FIG. 19 described above, in a case where the surrounding environment is 50 lux and the maximum luminance of the display screen SC is 70% of 350 cd/m$^2$, the result is that it is difficult to see a halo. This result suggests that when the halo black sensitivity value ω is equal to or less than 0.5, it is difficult to view a halo. Thus, in the liquid crystal display device LCD according to the fourth embodiment, the maximum luminance value of the display screen SC of the liquid crystal display device LCD is controlled so that the halo black sensitivity value ω is equal to or less than 0.5.

The above can be summarized as follows.

The liquid crystal display device LCD according to the fourth embodiment includes the brightness sensor LS and the control unit C. The control unit C includes a backlight control unit BLC (see FIGS. 2 and 10). The brightness sensor LS detects the brightness of the surrounding environment of the liquid crystal display device LCD.

The backlight control unit BLC in the control unit C reduces the brightness of the backlight BL in accordance with the brightness of the surrounding environment in a case where the above-described brightness of the surrounding environment detected by the brightness sensor LS is reduced. Consequently, it is possible to reduce the visibility of a halo.

Further, in the present embodiment, a first contrast value, which is the maximum transmittance/the minimum transmittance of the rear panel RP as a first liquid crystal panel, is referred to as UCR. A second contrast value, which is the maximum transmittance/the minimum transmittance of the front panel FP as a second liquid crystal panel, is referred to as MCR. The maximum luminance value of the liquid crystal display device LCD which is controlled by controlling the lighting luminance of the backlight BL is referred to as LUMA ($cd/m^2$). The brightness of the surrounding environment of the liquid crystal display device LCD is denoted as SB(1×).

The backlight control unit BLC in the control unit C controls the value of LUMA ($cd/m^2$) so that ω is set to a value equal to or less than a specific value, when a halo black sensitivity value of the liquid crystal display device LCD is set to be ω=(LUMA/MCR−LUMA/MCR/UCR)/(SB/100). Consequently, it is possible to reduce the visibility of a halo. In addition, when the specific value is 0.5, the visibility of a halo can be more effectively reduced.

Fifth Embodiment

Next, a liquid crystal display device according to a fifth embodiment will be described. Note that description of points similar to those in the fourth embodiment will not be repeated below. A liquid crystal display device LCD according to the fifth embodiment differs from the liquid crystal display device LCD according to the fourth embodiment in that a backlight BL includes a plurality of light sources L, the plurality of light sources L are separated into a plurality of areas, and a lighting luminance is independently controlled for each of the areas. In other respects, the liquid crystal display device LCD according to the fifth embodiment and the liquid crystal display device LCD according to the fourth embodiment are the same.

The liquid crystal display device LCD according to the fifth embodiment includes the backlight BL which is provided to overlap a rear panel RP as a first liquid crystal panel and provided on a side opposite to a front panel FP as a second liquid crystal panel, the backlight including the plurality of light sources L that are controlled by the control unit C. The backlight BL is divided into a plurality of lighting control areas.

Each of the plurality of lighting control areas includes at least one light source L. A backlight control unit BLC (see FIGS. 2 and 10) in the control unit C has a function capable of controlling the light emission luminance of the light source L in units of regions referred to as the lighting control areas.

The area control of the backlight BL is referred to as local dimming. The display of the liquid crystal display device LCD in which the area control of the backlight BL is performed by local dimming causes a problem in that a halo is viewed. The halo is not viewed as long as the minimum transmittance (black) of the liquid crystal panel is low. Since panel contrast can be increased by superimposing two panels on each other, the minimum transmittance rate of the liquid crystal panel (constituted by two panels) is reduced, and it is possible to reduce the visibility of a halo by performing local dimming of the plurality of lighting control areas of the backlight BL.

However, it is not possible to reduce the visibility of a halo due to a difference in pixel size between the front panel FP and the rear panel RP as described in the fourth embodiment. Thus, it is preferable that the control unit C perform control similar to the control performed by the backlight control unit BLC in the control unit C according to the fourth embodiment even when local dimming is performed.

The above can be summarized as follows. In the present embodiment, the backlight BL is divided into a plurality of areas. Each of the plurality of areas includes at least one light source L. The backlight control unit BLC in the control unit C individually controls lighting luminances of the plurality of areas on the basis of an input image signal Sin. Consequently, the backlight control unit BLC controls the luminance (average) of the entire backlight BL so that the halo black sensitivity value ω is set to be equal to or less than 0.5 in the same manner as in the fourth embodiment. Consequently, it is possible to effectively reduce the visibility of a halo.

While there have been described what are at present considered to be certain embodiments of the application, it will be understood that various modifications may be made thereto, and it is intended that the appended claim cover all such modifications as fall within the true spirit and scope of the application.

What is claimed is:

1. A liquid crystal display device comprising:
a first liquid crystal panel including a plurality of first pixels;
a second liquid crystal panel provided to overlap the first liquid crystal panel, the second liquid crystal panel including a plurality of second pixels, each of the plurality of second pixels having a set of subpixels, and the plurality of second pixels having a size different from a size of the plurality of first pixels; and
a control unit controlling the first liquid crystal panel and the second liquid crystal panel,
wherein:
the second liquid crystal panel includes a plurality of virtual opposing regions facing the plurality of first pixels with a one-to-one relationship,
each of the plurality of virtual opposing regions includes two or more subpixels or includes one or more subpixels and a predetermined number of subpixel partial structures, the predetermined number of subpixel partial structures being a portion of a predetermined number of the subpixels, and
for each of the plurality of virtual opposing regions, the control unit:
receives an input image signal including input display gray scale data corresponding to the virtual opposing region, and selects a set of pieces of subpixel gray scale data corresponding to the virtual opposing region from the input display gray scale data,
extracts a maximum amount of subpixel gray scale data among the set of pieces of subpixel gray scale data as extracted gray scale data corresponding to one first pixel facing the virtual opposing region among the plurality of first pixels, and
controls a transmittance of light of the one first pixel using designated pixel gray scale data in a case where the extracted gray scale data has a level equal to or higher than an output determination reference gray scale level, the designated pixel gray scale data being gray scale data having a maximum transmittance of the first liquid crystal panel,
wherein the control unit further:
stores each piece of previously calculated selected gray scale data corresponding to each of a plurality of pieces of the extracted gray scale data in a case where the extracted gray scale data has a level less than the output determination reference gray scale level, selects one piece of corresponding selected gray scale data in accordance with the extracted gray scale data from among the pieces of selected gray scale data, and controls a transmittance of light of the one first pixel by using the one piece of corresponding selected gray scale data.

2. The liquid crystal display device according to claim 1, wherein the control unit further:

receives an input image signal including input display gray scale data of a display pixel number, creates a downscaled image signal including a specific number of pieces of virtual input display gray scale data, the specific number of pieces of virtual input display gray scale data corresponding to a number of the plurality of first pixels in the first liquid crystal panel but less than the display pixel number, by using the input display gray scale data of the display pixel number, extracts extracted gray scale data corresponding to the one first pixel from the specific number of pieces of virtual input display gray scale data, and determines, based on the extracted gray scale data, panel input gray scale data to be input to the one first pixel to be the designated pixel gray scale data or the corresponding one selected gray scale data.

3. A liquid crystal display device comprising:

a first liquid crystal panel including a plurality of first pixels;

a second liquid crystal panel provided to overlap the first liquid crystal panel, the second liquid crystal panel including a plurality of second pixels, the plurality of second pixels having a size different from a size of the plurality of first pixels, and each of the plurality of second pixels including subpixels;

a backlight provided to overlap the first liquid crystal panel or the second liquid crystal panel;

a brightness sensor detecting a brightness of a surrounding environment of the first liquid crystal panel and the second liquid crystal panel; and a backlight control unit reducing a brightness of the backlight in a case where the brightness of the surrounding environment detected by the brightness sensor is reduced, wherein when a first contrast value being a maximum transmittance/a minimum transmittance of the first liquid crystal panel is set to be UCR, a second contrast value being a maximum transmittance/a minimum transmittance of the second liquid crystal panel is set to be MCR, a maximum luminance value of the liquid crystal display device is set to be LUMA (cd/m$^2$), and a halo black sensitivity value is set to be $\omega=$(LUMA/MCR−LUMA/MCR/UCR)/(SB/100) in a case where the brightness of the surrounding environment is set to be SB(1×), the backlight control unit controls the value of LUMA (cd/m$^2$) so that the halo black sensitivity value $\omega$ of the liquid crystal display device is set to be a value equal to or less than a specific value.

4. The liquid crystal display device according to claim 3, wherein the backlight includes a plurality of light sources and is divided into a plurality of areas, each of the plurality of areas includes at least one of the plurality of light sources, and the backlight control unit individually controls lighting luminances of the plurality of areas based on an input image signal.

* * * * *